US012749218B2

(12) United States Patent
Inukai et al.

(10) Patent No.: US 12,749,218 B2
(45) Date of Patent: Sep. 29, 2026

(54) DISPLAY SYSTEM AND DISPLAY METHOD

(71) Applicant: Panasonic Automotive Systems Co., Ltd., Kanagawa (JP)

(72) Inventors: Fumihito Inukai, Kyoto (JP); Toshiya Mori, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 219 days.

(21) Appl. No.: 18/887,714

(22) Filed: Sep. 17, 2024

(65) Prior Publication Data

US 2025/0014207 A1 Jan. 9, 2025

Related U.S. Application Data

(63) Continuation of application No. PCT/JP2023/003281, filed on Feb. 1, 2023.

(30) Foreign Application Priority Data

Mar. 30, 2022 (JP) ................................ 2022-054888

(51) Int. Cl.
*G06T 7/70* (2017.01)
*G06F 3/14* (2006.01)

(52) U.S. Cl.
CPC . *G06T 7/70* (2017.01); *G06F 3/14* (2013.01)

(58) Field of Classification Search
CPC .... G06V 20/588; G06V 20/56; G06V 10/462; G06V 10/255; G06T 2207/30252;
(Continued)

(56) References Cited

U.S. PATENT DOCUMENTS

2004/0080449 A1 4/2004 Horibe
2015/0178922 A1 6/2015 Nakai et al.
(Continued)

FOREIGN PATENT DOCUMENTS

JP 2004-144671 5/2004
JP 2011-022995 2/2011
(Continued)

OTHER PUBLICATIONS

International Search Report (ISR) from International Searching Authority (Japan Patent Office) in International Pat. Appl. No. PCT/JP2023/003281, dated Apr. 25, 2023, together with an English language translation.
(Continued)

*Primary Examiner* — Raphael Schwartz
(74) *Attorney, Agent, or Firm* — Greenblum & Bernstein, P.L.C.

(57) ABSTRACT

A display system includes: a position information obtainer that obtains position information indicating the position of a vanishing point calculated on the basis of two or more optical flows relating to each of a plurality of images captured by an imager that is mounted on a mobile object and repeatedly performs image capturing; a determiner that determines whether each of a plurality of vanishing points satisfies a predetermined condition, on the basis of a corresponding one of items of position information obtained by the position information obtainer; and an estimator that estimates an attitude of the mobile object, on the basis of one or more vanishing points, among the plurality of vanishing points, that are determined by the determiner to satisfy the predetermined condition.

11 Claims, 9 Drawing Sheets

(58) Field of Classification Search
CPC ....... G06T 7/246; G06T 7/70–77; G06T 7/20; G06T 7/248; G06T 7/251; G06T 2207/10016; G06T 2207/30241; G06T 2207/30248
See application file for complete search history.

(56) References Cited

U.S. PATENT DOCUMENTS

| | | | | |
|---|---|---|---|---|
| 2017/0227634 | A1* | 8/2017 | Matsumoto | G01S 7/497 |
| 2020/0198646 | A1* | 6/2020 | Sasaki | B60W 10/188 |
| 2020/0231093 | A1 | 7/2020 | Kobayashi et al. | |
| 2024/0355126 | A1* | 10/2024 | Higashibara | G06V 20/56 |

FOREIGN PATENT DOCUMENTS

| | | |
|---|---|---|
| JP | 2015-122547 | 7/2015 |
| JP | 6201148 | 9/2017 |
| JP | 2018-117218 | 7/2018 |
| JP | 2022-008108 | 1/2022 |
| WO | 2019/106951 | 6/2019 |

OTHER PUBLICATIONS

Office Action from Japan Patent Office (JPO) in Japanese Patent Appl. No. 2024-511329, dated Mar. 17, 2026, together with an English language translation.

* cited by examiner

DISPLAY SYSTEM AND DISPLAY METHOD

CROSS REFERENCE TO RELATED APPLICATIONS

This is a continuation application of PCT International Application No. PCT/JP2023/003281 filed on Feb. 1, 2023, designating the United States of America, which is based on and claims priority of Japanese Patent Application No. 2022-054888 filed on Mar. 30, 2022.

FIELD

The present disclosure relates to a display system and a display method.

BACKGROUND

Conventionally, there are known attitude estimation devices and so forth for estimating the attitude of a mobile object. Examples of the attitude estimation devices include a calibration device disclosed in Patent Literature (PTL) 1. Such calibration device calculates a camera installation parameter on the basis of a positional relation between the coordinates of two feature points in a camera image before a movement and the coordinates of two feature points that correspond to the foregoing two feature points in a camera image after the movement.

CITATION LIST

Patent Literature

PTL 1: WO2019/106951

SUMMARY

However, the calibration device according to PTL 1 can be improved upon.

In view of this, the present disclosure provides a display system and so forth capable of improving upon the above related art.

The display system according to an aspect of the preset disclosure is a display system including: an attitude estimation device that includes a position information obtainer that obtains position information indicating a position of a vanishing point that is calculated based on two or more optical flows relating to each of a plurality of images captured by an imager that is mounted on a mobile object and repeatedly performs image capturing, a determiner that determines whether each of a plurality of vanishing points satisfies a predetermined condition, based on a corresponding one of items of position information obtained by the position information obtainer, the plurality of vanishing points each being the vanishing point, the items of position information each being the position information, and an estimator that estimates an attitude of the mobile object, based on one or more vanishing points, among the plurality of vanishing points, that are determined by the determiner to satisfy the predetermined condition; an overlay position determination device that determines an overlay position at which to overlay content to be displayed on a target object, based on the attitude of the mobile object estimated by the attitude estimation device; and a display device that displays the content as a virtual image overlaid at the overlay position determined by the overlay position determination device.

The display method according to an aspect of the present disclosure includes: obtaining position information indicating a position of a vanishing point that is calculated based on two or more optical flows relating to each of a plurality of images captured by an imager that is mounted on a mobile object and repeatedly performs image capturing; determining whether each of a plurality of vanishing points satisfies a predetermined condition, based on a corresponding one of items of position information obtained in the obtaining, the plurality of vanishing points each being the vanishing point, the items of position information each being the position information; estimating an attitude of the mobile object, based on one or more vanishing points, among the plurality of vanishing points, determined in the determining to satisfy the predetermined condition; determining an overlay position at which to overlay content to be displayed on a target object, based on the attitude of the mobile object estimated in the estimating; and displaying the content as a virtual image overlaid at the overlay position determined in the determining of the overlay position.

These general and specific aspects may be implemented using a system, a method, an integrated circuit, a computer program, or a computer-readable recording medium such as a CD-ROM, or any combination of systems, methods, integrated circuits, computer programs, or recording media. Also, the recording medium may be a non-transitory recording medium.

The display system according to an aspect of the present disclosure is capable of improving upon the above related art.

Note that further merits and advantageous effects in an aspect of the present disclosure will become apparent from the following description and drawings. These merits and/or advantageous effects are provided the characteristics described in some embodiments and the following description and drawings. However, not all of these merits and advantageous effects need to be provided to achieve one or more identical characteristics.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Figure 1:
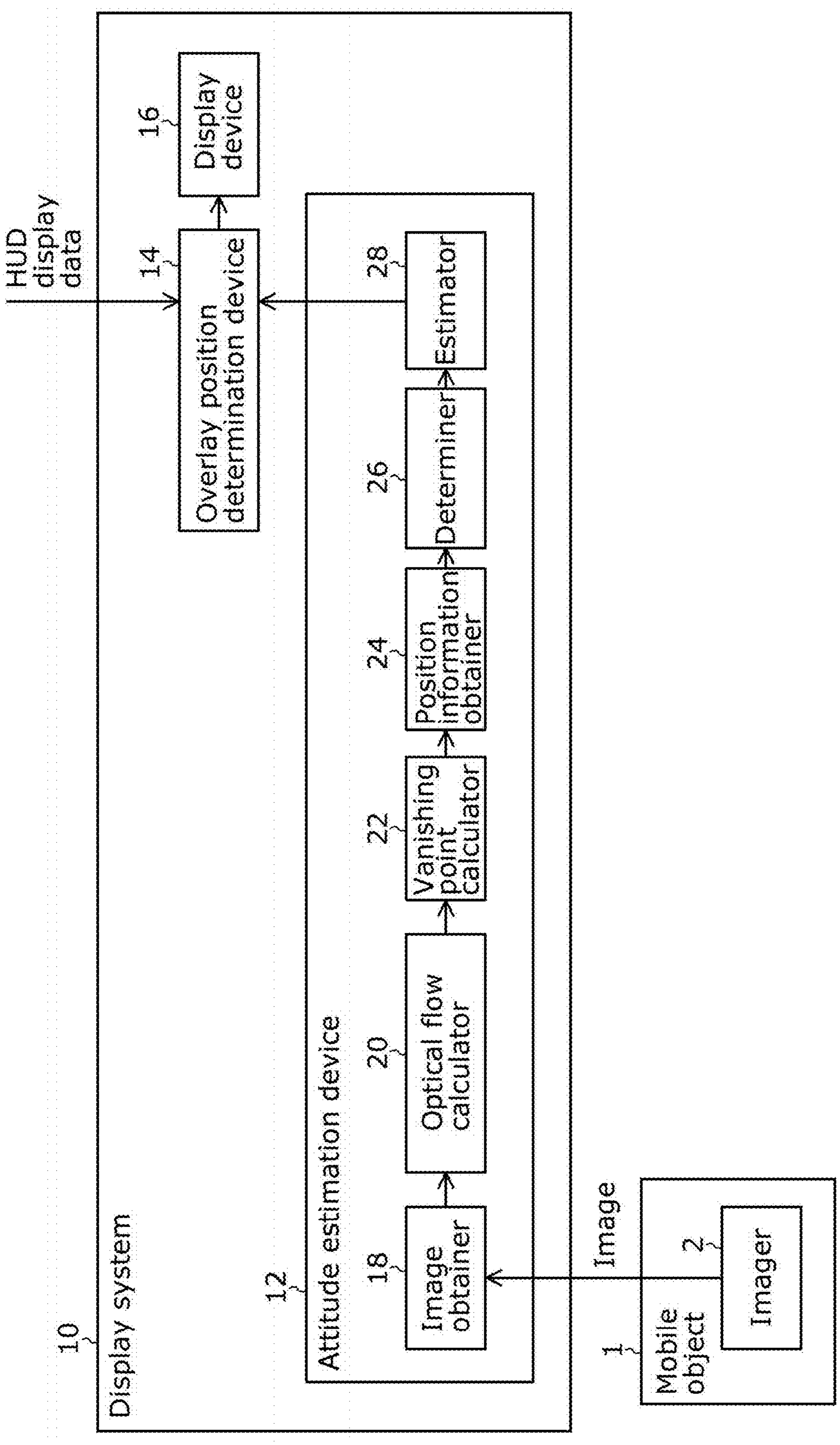
FIG. 1 is a block diagram showing the functional configuration of a display system according to an embodiment.

The display system according to an aspect of the present disclosure includes: an attitude estimation device that includes a position information obtainer that obtains position information indicating a position of a vanishing point that is calculated based on two or more optical flows relating to each of a plurality of images captured by an imager that is mounted on a mobile object and repeatedly performs image capturing, a determiner that determines whether each of a plurality of vanishing points satisfies a predetermined condition, based on a corresponding one of items of position information obtained by the position information obtainer, the plurality of vanishing points each being the vanishing point, the items of position information each being the position information, and an estimator that estimates an attitude of the mobile object, based on one or more vanishing points, among the plurality of vanishing points, that are determined by the determiner to satisfy the predetermined condition; an overlay position determination device that determines an overlay position at which to overlay content to be displayed on a target object, based on the attitude of the mobile object estimated by the attitude estimation device; and a display device that displays the content as a virtual image overlaid at the overlay position determined by overlay the position determination device.

With this, it is possible to estimate the attitude of the mobile object on the basis of one or more vanishing points determined to satisfy the predetermined condition, thus preventing the use of a vanishing point with poor calculation accuracy in estimating the attitude of the mobile object. It is thus possible to more accurately estimate the attitude of the mobile object. Also, since the attitude of the mobile object is estimated more accurately, it is possible to display content more appropriately. Stated differently, according to an aspect of the present disclosure, while the calibration device disclosed in PTL 1 fails to accurately estimate the attitude of the mobile object, it is possible to more accurately estimate the attitude of the mobile object and more appropriately display the content.

Also, the predetermined condition may include a first condition, and when a vanishing point, among the plurality of vanishing points, to be subjected to a determination of whether the vanishing point satisfies the first condition is taken as a determination target vanishing point, and a vanishing point, among the plurality of vanishing points, relating to an image captured one image before an image relating to the determination target vanishing point among the plurality of images is taken as a comparison vanishing point, the first condition may be a condition that an amount of displacement of the determination target vanishing point from the comparison vanishing point falls within a predetermined range.

With this, it is possible to prevent the use of the determination target vanishing point in estimating the attitude of the mobile object, when the amount of displacement of such determination target vanishing point from the comparison vanishing point does not fall within the predetermined range. It is thus possible to more accurately estimate the attitude of the mobile object and more appropriately display the content.

Also, the predetermined condition may include a first condition, and when a vanishing point, among the plurality of vanishing points, to be subjected to a determination of whether the vanishing point satisfies the first condition is taken as a determination target vanishing point, and an image, among the plurality of images, relating to the determination target vanishing point is taken as a determination target image, the first condition may be a condition that a degree of variability falls within a predetermined range, the degree of variability being a degree at which the two or more optical flows relating to the determination target image vary with respect to the determination target vanishing point.

With this, it is possible to prevent the use of the determination target vanishing point in estimating the attitude of the mobile object, when the degree of variability of the two or more optical flows relating to the determination target image with respect to such determination target vanishing point does not fall within the predetermined range. It is thus possible to more accurately estimate the attitude of the mobile object and more appropriately display the content.

Also, the predetermined condition may include a first condition, and when a vanishing point, among the plurality of vanishing points, to be subjected to a determination of whether the vanishing point satisfies the first condition is taken as a determination target vanishing point, the first condition may be a condition that the determination target vanishing point is located within a predetermined range.

With this, it is possible to prevent the use of the determination target vanishing point in estimating the attitude of the mobile object, when such determination target vanishing point does not fall within the predetermined range. It is thus possible to more accurately estimate the attitude of the mobile object and more appropriately display the content.

Also, the predetermined condition may include a second condition of not being a vanishing point, among the plurality of vanishing points, relating to an image captured one image after an image, among the plurality of images, relating to a vanishing point that is determined not to satisfy the first condition, or not being two or more vanishing points, among the plurality of vanishing points, relating to two or more images subsequent to the image captured one image after the image, among the plurality of images, relating to the vanishing point determined not to satisfy the first condition.

With this, it is possible to prevent the use of the vanishing point, in estimating the attitude of the mobile object, which is a vanishing point relating to the image captured at the timing that is close to the timing at which the image relating to the vanishing point determined not to satisfy the first condition is captured. It is thus possible to more accurately estimate the attitude of the mobile object and more appropriately display the content.

Also, the predetermined condition may include a second condition of not being a vanishing point, among the plurality of vanishing points, relating to an image captured one image after a last captured image in two or more subsequent images, among the plurality of images, whose vanishing points are determined not to satisfy the first condition or not being two or more vanishing points, among the plurality of vanishing points, relating to two or more images subsequent to the image captured one image after the last captured image in the two or more subsequent images, among the plurality of images, whose vanishing points are determined not to satisfy the first condition.

With this, it is possible to prevent the use of the vanishing points, in estimating the attitude of the mobile object, which are the vanishing points relating to the images captured at the timing that is close to the timing at which the two or more subsequent images relating to the vanishing points determined not to satisfy the first condition are captured. It is thus possible to more accurately estimate the attitude of the mobile object and more appropriately display the content.

Also, the predetermined condition may include a third condition that an amount of change in a speed of the mobile object during a predetermined period falls within a predetermined range, the predetermined period being a period until a point in time at which an image among the plurality of images is captured, the image relating to a vanishing point, among the plurality of vanishing points, to be subjected to a determination of whether the vanishing point satisfies the third condition.

With this, it is possible to prevent the use of the vanishing point, in estimating the attitude of the mobile object, which is a vanishing point relating to the image captured when the amount of change in the speed of the mobile object does not fall within the predetermined range. It is thus possible to more accurately estimate the attitude of the mobile object and more appropriately display the content.

Also, the estimator may estimate the attitude of the mobile object, based on two or more vanishing points among the one or more vanishing points determined by the determiner to satisfy the predetermined condition, the two or more vanishing points being vanishing points whose degree of variability falls within a predetermined range.

With this, it is possible to estimate the attitude of the mobile object on the basis of the two or more vanishing points whose degree of variability is within the predetermined range. It is thus possible to more accurately estimate the attitude of the mobile object and more appropriately display the content.

Also, the display system according to an aspect of the present disclosure may further include: an image obtainer that obtains the plurality of images; an optical flow calculator that calculates the two or more optical flows relating to each of the plurality of images; and a vanishing point calculator that calculates the vanishing point relating to each of the plurality of images, based on the two or more optical flows relating to each of the plurality of images.

With this, it is possible, in the display system, to calculate two or more optical flows relating to each of the plurality of images and calculate a vanishing point relating to each of the plurality of images.

Also, when an image, among the plurality of images, to be subjected to a calculation of the two or more optical flows is taken as a calculation target image, and an image, among the plurality of images, captured before the calculation target image is taken as a previous image, the optical flow calculator may: determine the previous image for each of the two or more optical flows relating to the calculation target image; extract a feature part that appears in both the calculation target image and the previous image determined; calculate a line that passes through a first feature point and a second feature point, the first feature point being a point in the calculation target image and indicating a position of the feature part in the calculation target image, the second feature point being a point in the calculation target image and indicating a position of the feature part in the previous image determined; and take the line calculated as the optical flow.

With this, it is possible to easily calculate each of the two or more optical flows relating to the calculation target image.

Also, the optical flow calculator may determine, as the previous image, an image captured two or more images before the calculation target image for at least one of the two or more optical flows relating to the calculation target image.

With this, it is possible to more accurately calculate at least one of the two or more optical flows relating to the calculation target image, using an increased distance between the first feature point and the second feature point. It is thus possible to more accurately calculate the vanishing point relating to the calculation target image, more accurately estimate the attitude of the mobile object, and more appropriately display the content.

Also, the optical flow calculator may determine, as the previous image, the image captured two or more images before the calculation target image for each of 50% or more optical flows among the two or more optical flows relating to the calculation target image.

With this, it is possible to more accurately calculate the number of optical flows that is greater than or equal to 50% of the two or more optical flows relating to the calculation target image. It is thus possible to more accurately calculate the vanishing point relating to the calculation target image, more accurately estimate the attitude of the mobile object, and more appropriately display the content.

Also, when a distance between the first feature point and the second feature point is taken as a feature point distance, the optical flow calculator may determine the previous image with which the feature point distance is greater than or equal to a predetermined distance for at least one of the two or more optical flows relating to the calculation target image.

With this, it is possible to more accurately calculate at least one of the two or more optical flows relating to the calculation target image, using the distance between the first feature point and the second feature point that is greater than or equal to the predetermined distance. It is thus possible to more accurately calculate the vanishing point relating to the calculation target image, more accurately estimate the attitude of the mobile object, and more appropriately display the content.

Also, the display method according to an aspect of the present disclosure includes: obtaining position information indicating a position of a vanishing point that is calculated based on two or more optical flows relating to each of a plurality of images captured by an imager that is mounted on a mobile object and repeatedly performs image capturing; determining whether each of a plurality of vanishing points satisfies a predetermined condition, based on a corresponding one of items of position information obtained in the obtaining, the plurality of vanishing points each being the vanishing point, the items of position information each being the position information; estimating an attitude of the mobile object, based on one or more vanishing points, among the plurality of vanishing points, determined in the determining to satisfy the predetermined condition; determining an overlay position at which to overlay content to be displayed on a target object, based on the attitude of the mobile object estimated in the estimating; and displaying the content as a virtual image overlaid at the overlay position determined in the determining of the overlay position.

With this, it is possible to achieve the same working effects as those achieved by the foregoing display system.

Note that the embodiment described below shows a specific example of the present disclosure. The numerical values, shapes, materials, elements, the arrangement and connection of the elements, steps, the processing order of the steps, etc. shown in the following embodiment are mere examples, and thus are not intended to limit the present disclosure. Of the elements described in the following embodiment, those not recited in any one of the independent claims are described as optional elements.

Embodiment

FIG. 1 is a block diagram showing the functional configuration of display system 10 according to an embodiment. With reference to FIG. 1, the following describes the functional configuration of display system 10.

As shown in FIG. 1, display system 10 projects light toward a windshield of mobile object 1. At least part of the projected light is reflected at the windshield. Such reflected light travels toward the eyes of a user riding on mobile object 1. The user perceives the reflected light that enters the user's eyes as a virtual image which appears as if it was an image of an object that is present on the other side of the user (outside of mobile object 1) across the windshield, against the background in which an actual object is seen through the windshield. Such virtual image is displayed in an overlaid manner on the actual view the user is seeing within the sight of the user. More specifically, the virtual image is displayed in an overlaid manner on a target object such as a road surface, a building, a nearby vehicle, a pedestrian, etc. Mobile object 1 is, for example, a vehicle. Display system 10 includes attitude estimation device 12, overlay position determination device 14, and display device 16.

Attitude estimation device 12 estimates the attitude of mobile object 1. Attitude estimation device 12 includes image obtainer 18, optical flow calculator 20, vanishing point calculator 22, position information obtainer 24, determiner 26, and estimator 28.

Image obtainer 18 obtains a plurality of images captured by imager 2, which is mounted on mobile object 1 and repeatedly performs image capturing. Every time imager 2 captures an image, for example, image obtainer 18 obtains such image, thereby obtaining a plurality of images. For example, imager 2 is mounted on mobile object 1 to be able to capture an image of the front view of mobile object 1, and repeatedly captures an image of the front view of mobile object 1. For example, imager 2 performs image capturing at predetermined time intervals. The plurality of images thus show the front view of mobile object 1 at the predetermined time intervals. Imager 2 is, for example, a camera.

Optical flow calculator 20 calculates two or more optical flows relating to each of the plurality of images. Every time image obtainer 18 obtains an image, for example, optical flow calculator 20 calculates two or more optical flows relating to such image, thereby calculating two or more optical flows relating to each of the plurality of images.

More specifically, when image obtainer 18 obtains a first image, for example, optical flow calculator 20 calculates two or more optical flows relating to the first image. Similarly, when image obtainer 18 obtains a second image that is captured subsequently to the first image, optical flow calculator 20 calculates two or more optical flows relating to the second image, and when image obtainer 18 obtains a third image that is captured subsequently to the second image, optical flow calculator 20 calculates two or more optical flows relating to the third image.

When an image to be subjected to a calculation of two or more optical flows among the plurality of images is taken as a calculation target image, and an image captured before the calculation target image among the plurality of images is taken as a previous image, for example, optical flow calculator 20: determines the previous image for each of the two or more optical flows relating to the calculation target image; extracts a feature part that appears in both the calculation target image and the determined previous image; calculates a line that passes through a first feature point, which is a point in the calculation target image and indicates the position of the feature part in the calculation target image and, a second feature point, which is a point in the calculation target image and indicates the position of the feature part in the determined previous image; and determines the calculated line as the foregoing optical flow. The first feature point is, for example, a pixel that is in the calculation target image and indicates the position of the feature part in the calculation target image. Also, the second feature point is, for example, a pixel that is in the calculation target image and indicates the position of the feature part in the previous image.

More specifically, when image obtainer 18 obtains the first image, the second image, and the third image, and optical flow calculator 20 calculates a first optical flow, a second optical flow, and a third optical flow relating to the third image, for example, optical flow calculator 20: determines the first image or the second image captured before the third image as the previous image for the first optical flow relating to the third image; determines the first image or the second image captured before the third image as the previous image for the second optical flow relating to the third image; and determines the first image or the second image captured before the third image as the previous image for the third optical flow relating to the third image. Note that the previous image for the first optical flow, the previous image for the second optical flow, and the previous image for the third optical flow may be mutually different images.

When determining the second image as the previous image for the first optical flow relating to the third image, for example, optical flow calculator 20 extracts a feature part that appears in both the third image and the second image. The feature part is, for example, a building corner, a door corner of a building, etc.

When optical flow calculator 20 extracts, as a feature part, "building corner" that appears in both the third image and the second image, for example, optical flow calculator 20 calculates a line that passes through a first feature point, which is a point in the third image and indicates the position of the foregoing "building corner" in the third image and, a second feature point, which is a point in the third image and indicates the position of the foregoing "building corner" in the second image, and takes such calculated line as the first optical flow relating to the third image. The first feature point is, for example, a pixel that is in the third image and indicates the position of the foregoing "building corner" in the third image. Also, the second feature point is, for example, a pixel that is in the third image and indicates the position of the foregoing "building corner" in the second image.

Also, for example, optical flow calculator 20 determines an image captured two or more images before the calculation target image as the previous image for at least one of the two or more optical flows relating to the calculation target image. For example, optical flow calculator 20 determines an image captured two or more images before the calculation target image as the previous image for an optical flow with which the distance between the first feature point and the second feature point (hereinafter also referred toas "feature point distance") is shorter than a predetermined distance, among the two or more optical flows relating to the calculation target image when the image that is one image before the calculation target image is the previous image.

More specifically, when image obtainer 18 obtains the first image, the second image, and the third image, and optical flow calculator 20 calculates the first optical flow, the second optical flow, and the third optical flow relating to the third image, for example, optical flow calculator 20 determines the first image captured two or more images before the third image as the previous image for at least one of the first optical flow, the second optical flow, and the third optical flow. When the feature point distance is shorter than the predetermined distance in the case where the second image is the previous image for the second optical flow, for example, optical flow calculator 20 determines the first image as the previous image.

Also, for example, optical flow calculator 20 determines an image captured two or more images before the calculation target image as the previous image for each of the number of optical flows that is greater than or equal to 50% of the two or more optical flows relating to the calculation target image. When calculating twenty optical flows relating to the calculation target image, for example, optical flow calculator 20 determines an image captured two or more images before the calculation target image as the previous image for each of ten or more optical flows among the twenty optical flows. For example, optical flow calculator 20 preferentially determines, as the image captured two or more images before the calculation target image, the previous image relating to the optical flow, among the two or more optical flows relating to the calculation target image, with which t the feature point distance is shorter than the predetermined distance when the image that is one image before the calculation target image is the previous image. Note that optical flow calculator 20 may determine an image captured two or more images before the calculation target image as the previous image for each of the number of optical flows that is greater than or equal to 90% of the two or more optical flows relating to the calculation target image. With this, it is possible to more accurately calculate vanishing points.

More specifically, when image obtainer 18 obtains the first image, the second image, and the third image, and optical flow calculator 20 calculates the first optical flow, the second optical flow, and the third optical flow relating to the third image, for example, optical flow calculator 20 determines the first image as the previous image for each of the first optical flow, the second optical flow, and the third optical flow.

Also, when the distance between the first feature point and the second feature point is taken as a feature point distance, for example, optical flow calculator 20 determines the previous image, for at least one of the two or more optical flows relating to the calculation target image, with which the feature point distance is greater than or equal to a predetermined distance. For example, optical flow calculator 20 preferentially determines the previous image for the optical flow, among the two or more optical flows relating to the calculation target image, with which the feature point distance is shorter, so that the feature point distance is greater than or equal to the predetermined distance.

More specifically, when image obtainer 18 obtains the first image, the second image, and the third image, and optical flow calculator 20 calculates the first optical flow, the second optical flow, and the third optical flow relating to the third image, for example, optical flow calculator 20 determines the first image as the previous image for the first optical flow, when the feature point distance relating to the first optical flow is shorter than the predetermined distance in the case where the second image is the previous image and the feature point distance relating to the first optical flow is greater than or equal to the predetermined distance in the case where the first image is the previous image.

Vanishing point calculator 22 calculates the vanishing point relating to each of the plurality of images, on the basis of the two or more optical flows relating to the image. Every time optical flow calculator 20 calculates two or more optical flows, for example, vanishing point calculator 22 calculates the vanishing point in the image relating to such two or more optical flows, thereby calculating the vanishing point relating to each of the plurality of images.

More specifically, when image obtainer 18 obtains the first image, the second image, and the third image, for example, vanishing point calculator 22 calculates the vanishing point relating to the first image, on the basis of two or more optical flows relating to the first image. Similarly, vanishing point calculator 22 calculates the vanishing point relating to the second image, on the basis of two or more optical flows relating to the second image, and calculates the vanishing point relating to the third image, on the basis of two or more optical flows relating to the third image.

For an image in which the number of intersections of two or more optical flows is one, among the plurality of images, for example, vanishing point calculator 22 calculates such intersection as the vanishing point.

For example, vanishing point calculator 22 calculates, as the vanishing point, a calculation point to be described below for an image, among the plurality of images, in which the number of intersections of two or more optical flows is two or more. That is to say, when the value obtained by subtracting the average value of two or more distances between the foregoing calculation point and the two or more optical flows from the longest distance of such two or more distances is taken as a first calculation value, and the value obtained by subtracting the shortest distance of the two or more distances from such average value is taken as a second calculation value, for example, the foregoing calculation point is a point with which the absolute value of the difference value between the first calculation value and the second calculation value falls within a predetermined range. The predetermined range is, for example, between 0 [pix] and 75 [pix], inclusive.

More specifically, when the first optical flow, the second optical flow, and the third optical flow are calculated for an image to be subjected to vanishing point calculation, for example, vanishing point calculator 22 tentatively determines a calculation point, and then calculates a first distance, which is the distance between such calculation point and the first optical flow, a second distance, which is the distance between such calculation point and the second optical flow, and a third distance, which is the distance between such calculation point and the third optical flow. When the first distance is the longest and the second distance is the shortest among the first distance, the second distance, and the third distance, for example, vanishing point calculator 22 calculates the first calculation value by subtracting, from the first distance, the average value of the first distance, the second distance, and the third distance, and calculates the second calculation value by subtracting the second distance from such average value. When the absolute value of the difference value between the first calculation value and the second calculation value falls within the predetermined range, for example, vanishing point calculator 22 takes the tentatively determined calculation point as the vanishing point. When the absolute value of the difference value between the first calculation value and the second calculation value does not fall within the predetermined range, for example, vanishing point calculator 22 tentatively determines a calculation point again, and repeats the above processes again.

Position information obtainer 24 obtains position information indicating the position of the vanishing point calculated on the basis of the two or more optical flows relating to each of the plurality of images captured by imager 2, which is mounted on mobile object 1 and repeatedly performs image capturing. Stated differently, position information obtainer 24 obtains the position information indicating the position of the vanishing point relating to each of the plurality of images. Every time a vanishing point is calculated, for example, position information obtainer 24 obtains the position information relating to such vanishing point, thereby obtaining items of position information relating to the plurality of images. In the present embodiment, position information obtainer 24 obtains the position information indicating the position of a vanishing point calculated by vanishing point calculator 22. The position information is, for example, coordinate values indicating the position of a vanishing point in an image. More specifically, the position information is, for example, an X-coordinate value and a Y-coordinate value indicating the position of the vanishing point in the image. Note that position information obtainer 24 may obtain, for example, the position information indicating the position of a vanishing point calculated outside of attitude estimation device 12.

Determiner 26 determines whether each of the plurality of vanishing points satisfies a predetermined condition, on the basis of a corresponding one of the items of position information obtained by position information obtainer 24. Every time position information obtainer 24 obtains position information, for example, determiner 26 determines whether the vanishing point relating to such position information satisfies the predetermined condition, on the basis of the obtained position information.

The predetermined condition includes, for example, a displacement amount condition, which is an example of the first condition. The displacement amount condition is a condition described below. That is to say, when a vanishing point to be subjected to a determination of whether the vanishing point satisfies the displacement amount condition is taken as a determination target vanishing point and a vanishing point relating to the image captured one image before the image relating to the determination target vanishing point among the plurality of images is taken as a comparison vanishing point, the displacement amount condition specifies that the amount of displacement of the determination target vanishing point from the comparison vanishing point falls within a predetermined range. Stated differently, the displacement amount condition is a condition that the amount of displacement from the comparison vanishing point to the determination target vanishing point falls within the predetermined range.

When the amount of displacement of the determination target vanishing point from the comparison vanishing point falls within the predetermined range, determiner 26 determines that such determination target vanishing point satisfies the displacement amount condition. Meanwhile, when the amount of displacement of the determination target vanishing point from the comparison vanishing point does not fall within the predetermined range, determiner 26 determines that such determination target vanishing point does not satisfy the displacement amount condition.

More specifically, the displacement amount condition includes, for example, a condition relating to the amount of displacement of the determination target vanishing point from the comparison vanishing point in the X-axis direction and a condition relating to the amount of displacement of the determination target vanishing point from the comparison vanishing point in the Y-axis direction.

For example, determiner 26 calculates the amount of displacement of the determination target vanishing point from the comparison vanishing point in the X-axis direction by subtracting the X-coordinate value of the comparison vanishing point from the X-coordinate value of the determination target vanishing point, using the position information indicating the position of the determination target vanishing point and the position information indicating the position of the comparison vanishing point. Also, for example, determiner 26 calculates the amount of displacement of the determination target vanishing point from the comparison vanishing point in the Y-axis direction by subtracting the Y-coordinate value of the comparison vanishing point from the Y-coordinate value of the determination target vanishing point, using the position information indicating the position of the determination target vanishing point and the position information indicating the position of the comparison vanishing point.

When the amount of displacement of the determination target vanishing point from the comparison vanishing point in the X-axis direction falls within the predetermined range and the amount of displacement of the determination target vanishing point from the comparison vanishing point in the Y-axis direction falls within the predetermined range, for example, determiner 26 determines that such determination target vanishing point satisfies the displacement amount condition. Meanwhile, when at least one of the amount of displacement of the determination target vanishing point from the comparison vanishing point in the X-axis direction or the amount of displacement of the determination target vanishing point from the comparison vanishing point in the Y-axis direction does not fall within the predetermined range, determiner 26 determines that such determination target vanishing point does not satisfy the displacement amount condition.

Also, in the case such as where a pitch-angle attitude of mobile object 1 is wished to be estimated, for example, determiner 26 determines that the determination target vanishing point satisfies the displacement amount condition, when the amount of displacement of the determination target vanishing point from the comparison vanishing point in the Y-axis direction falls within the predetermined range.

Also, in the case such as where a yaw-angle attitude of mobile object 1 is wished to be estimated, for example, determiner 26 determines that the determination target vanishing point satisfies the displacement amount condition, when the amount of displacement of the determination target vanishing point from the comparison vanishing point in the X-axis direction falls within the predetermined range.

Also, the predetermined condition includes, for example, a variability condition, which is an example of the first condition. The variability condition is a condition described below. That is to say, when a vanishing point to be subjected to a determination of whether the vanishing point satisfies the variability condition is taken as a determination target vanishing point and the image relating to the determination target vanishing point among the plurality of images is taken as a determination target image, the variability condition species that the degree of variability of the two or more optical flows relating to the determination target image relative to the determination target vanishing point falls within a predetermined range.

The degree of variability is represented, for example, by the standard deviation of two or more distances between the determination target vanishing point and each of the two or more optical flows.

When the standard deviation of the two or more distances between the determination target vanishing point and the two or more optical flows falls within a predetermined range, for example, determiner 26 determines that such determination target vanishing point satisfies the variability condition. Meanwhile, when the standard deviation of the two or more distances between the determination target vanishing point and the two or more optical flows does not fall within the predetermined range, determiner 26 determines that such determination target vanishing point does not satisfy the variability condition.

Also, the degree of variability is represented by, for example, the dispersion of the two or more distances between the determination target vanishing point and the two or more optical flows.

When the dispersion of the two or more distances between the determination target vanishing point and the two or more optical flows falls within a predetermined range, for example, determiner 26 determines that such determination target vanishing point satisfies the variability condition. Meanwhile, when the dispersion of the two or more distances between the determination target vanishing point and the two or more optical flows does not fall within the predetermined range, determiner 26 determines that such determination target vanishing point does not satisfy the variability condition.

Also, the degree of variability is represented by, for example, the absolute value of a difference value described below. That is to say, when a vanishing point to be subjected to a determination of whether the vanishing point satisfies the variability condition is taken as a determination target vanishing point, the image relating to the determination target vanishing point among the plurality of images is taken as a determination target image, two or more distances between the determination target vanishing point and two or more optical flows relating to the determination target image are taken as two or more determination target distances, the value obtained by subtracting the average value of the two or more determination target distances from the longest determination target distance of the two or more determination target distances is taken as a first target value, and the value obtained by subtracting the shortest determination target distance of the two or more determination target distances from the average value is taken as a second target value, the absolute value of the foregoing difference value is the absolute value of the difference value between the first target value and the second target value.

When the absolute value of the difference value between the first target value and the second target value falls within a predetermined range, for example, determiner 26 determines that the determination target vanishing point satisfies the variability condition. Meanwhile, when the absolute value of the difference value between the first target value and the second target value does not fall within the predetermined range, determiner 26 determines that the determination target vanishing point does not satisfy the variability condition.

More specifically, when the first optical flow, the second optical flow, and the third optical flow have been calculated for the determination target image, for example, determiner 26 calculates a first determination target distance, which is the distance between the determination target vanishing point and the first optical flow, a second determination target distance, which is the distance between the determination target vanishing point and the second optical flow, and a third determination target distance, which is the distance between the determination target vanishing point and the third optical flow. For example, the first determination target distance is the length of a perpendicular line drawn from the determination target vanishing point to the first optical flow, the second determination target distance is the length of a perpendicular line drawn from the determination target vanishing point to the second optical flow, and the third determination target distance is the length of a perpendicular line drawn from the determination target vanishing point to the third optical flow. Stated differently, the two or more determination target distances are the lengths of perpendicular lines drawn from the determination target vanishing point to the two or more optical flows.

When the first determination target distance is the longest and the second determination target distance is the shortest among the first determination target distance, the second determination target distance, and the third determination target distance, for example, determiner 26 determines, as a first target value, the value obtained by subtracting the average value of the first determination target distance, the second determination target distance, and the third determination target distance from the first determination target distance, and determines, as a second target value, the value obtained by subtracting the second target determination target distance from the average value.

When the absolute value of the difference value between the first target value and the second target value falls within a predetermined range, for example, determiner 26 determines that such determination target vanishing point satisfies the variability condition. Meanwhile, when the absolute value of the difference value between the first target value and the second target value does not fall within the predetermined range, determiner 26 determines that such determination target vanishing point does not salsify the variability condition.

Also, the predetermined condition includes, for example, a position condition, which is an example of the first condition. The position condition is a condition described below. That is to say, when a vanishing point to be subjected to a determination of whether the vanishing point satisfies the position condition is taken as a determination target vanishing point, the position condition specifies that the determination target vanishing point is located within a predetermined range.

When the determination target vanishing point is located within the predetermined range, determiner 26 determines that such determination target vanishing point satisfies the position condition. Meanwhile, when the determination target vanishing point is not located within the predetermined range, determiner 26 determines that such determination target vanishing point does not satisfy the position condition.

More specifically, the position condition includes, for example, a condition relating to the position of the determination target vanishing point in the X-axis direction and a condition relating to the position of the determination target vanishing point in the Y-axis direction.

For example, determiner 26 obtains the position of the determination target vanishing point in the X-axis direction and the position of the determination target vanishing point in the Y-axis direction from the position information indicating the position of the determination target vanishing point.

When the position of the determination target vanishing point in the X-axis direction is within the predetermined range and the position of the determination target vanishing point in the Y-axis direction is within the predetermined range, for example, determiner 26 determines that such determination target vanishing point satisfies the position condition. Meanwhile, when at least one of the position of the determination target vanishing point in the X-axis direction or the position of the determination target vanishing point in the Y-axis direction is not within the predetermined range, determiner 26 determines that such determination target vanishing point does not satisfy the position condition.

Also, the predetermined condition includes, for example, a first subsequence condition, which is an example of the second condition. The first subsequence condition is a condition of not being the vanishing point relating to the image captured one image after an image relating to a vanishing point that is determined not to satisfy the first condition (in the present embodiment, the displacement amount condition, the difference value condition, and the position condition) among the plurality of images, or not being the two or more vanishing points relating to the two or more images that are subsequent to the image captured one image after an image relating to a vanishing point that is determined not to satisfy the first condition among the plurality of images.

When a determination target vanishing point to be subjected to a determination of whether the determination target vanishing point satisfies the first subsequence condition is not the vanishing point relating to the image that is captured one image after the image relating to the vanishing point that is determined not to satisfy the first condition among the plurality of images, for example, determiner 26 determines that such determination target vanishing point satisfies the first subsequence condition. Also, when a determination target vanishing point to be subjected to a determination of whether the determination target vanishing point satisfies the first subsequence condition is the vanishing point relating to the image that is captured one image after the image relating to the vanishing point that is determined not to satisfy the first condition among the plurality of images, for example, determiner 26 determines that such determination target vanishing point does not satisfy the first subsequence condition.

More specifically, when the first subsequence condition is a condition of not being the vanishing point relating to the image that is captured one image after the image relating to the vanishing point that is determined not to satisfy the first condition among the plurality of images, and the first image, the second image captured one image after the first image, and the third image captured one image after the second image are present, for example, determiner 26 determines that the vanishing point relating to the second image does not satisfy the first subsequence condition, when the vanishing point relating to the first image is determined not to satisfy the first condition. Also, when the first subsequence condition is a condition of not being the vanishing point relating to the image that is captured one image after the image relating to the vanishing point that is determined not to satisfy the first condition among the plurality of images, and the first image, the second image captured one image after the first image, and the third image captured one image after the second image are present, for example, determiner 26 determines that the vanishing point relating to the third image satisfies the first subsequence condition, when the vanishing point relating to the second image is determined to satisfy the first condition.

Also, when determination target vanishing points to be subjected to a determination of whether the determination target vanishing points satisfy the first subsequence condition are not the vanishing points relating to two or more images subsequent to the image that is captured one image after an image relating to a vanishing point that is determined not to satisfy the first condition among the plurality of images, for example, determiner 26 determines that such determination target vanishing points satisfy the first subsequence condition. Also, when determination target vanishing points to be subjected to a determination of whether the determination target vanishing points satisfy the first subsequence condition are the vanishing points relating to two or more images subsequent to the image that is captured one image after an image relating to a vanishing point that is determined not to satisfy the first condition among the plurality of images, for example, determiner 26 determines that such determination target vanishing points do not satisfy the first subsequence condition.

More specifically, when the first subsequence condition is a condition of not being the vanishing points relating to the two images subsequent to the image that is captured one image after the image relating to the vanishing point that is determined not to satisfy the first condition among the plurality of images, and the first image, the second image captured one image after the first image, and the third image captured one image after the second image are present, for example, determiner 26 determines that the vanishing point relating to the second image and the vanishing point relating to the third image do not satisfy the first subsequence condition, when the vanishing point relating to the first image does not satisfy the first condition.

Also, the predetermined condition includes, for example, a second subsequence condition, which is an example of the second condition. The second subsequence condition is a condition of not being the vanishing point relating to the image that is captured one image after the last captured image among two or more subsequent images, in the plurality of images, whose vanishing points are determined not to satisfy the first condition, or not being the two or more vanishing points relating to the two or more images subsequent to the image that is captured one image after the last captured image among two or more subsequent images, in the plurality of images, whose vanishing points are determined not to satisfy the first condition.

For example, when a determination target vanishing point to be subjected to a determination of whether the determination target vanishing point satisfies the second subsequence condition is not the vanishing point relating to the image that is captured one image after the last captured image among two or more subsequent images, in the plurality of images, whose vanishing points are determined not to satisfy the first condition, for example, determiner 26 determines that such determination target vanishing point satisfies the second subsequence condition. Also, when a determination target vanishing point to be subjected to a determination of whether the determination target vanishing point satisfies the second subsequence condition is the vanishing point relating to the image that is captured one image after the last captured image among two or more subsequent images, in the plurality of images, whose vanishing points are determined not to satisfy the first condition, for example, determiner 26 determines that such determination target vanishing point does not satisfy the second subsequence condition.

More specifically, when the second subsequence condition is a condition of not being the vanishing point relating to the image that is captured one image after the last captured image among two subsequent images, in the plurality of images, whose vanishing points are determined not to satisfy the first condition, and when the first image, the second image captured one image after the first image, the third image captured one image after the second image, and the fourth image captured one image after the third image are present, for example, determiner 26 determines that the vanishing point relating to the third image does not satisfy the second subsequence condition, when the vanishing point relating to the first image and the vanishing point relating to the second image are determined not to satisfy the first condition. Also, when the second subsequence condition is a condition of not being the vanishing point relating to the image that is captured one image after the last captured image among two subsequent images, in the plurality of images, whose vanishing points are determined not to satisfy the first condition, and when the first image, the second image captured one image after the first image, the third image captured one image after the second image, and the fourth image captured one image after the third image are present, for example, determiner 26 determines that the vanishing point relating to the fourth image satisfies the second subsequence condition when the vanishing point relating to the third image is determined to satisfy the first condition.

Also, when determination target vanishing points to be subjected to a determination of whether the determination target vanishing points satisfy the second subsequence condition are not the two or more vanishing points relating to two or more images subsequent to the image that is captured one image after the last captured image among two or more subsequent images, in the plurality of images, whose vanishing points are determined not to satisfy the first condition, for example, determiner 26 determines that such determination target vanishing points satisfy the second subsequence condition. Also, when determination target vanishing points to be subjected to a determination of whether the determination target vanishing points satisfy the second subsequence condition are the two or more vanishing points relating to two or more images subsequent to the image that is captured one image after the last captured image among two or more subsequent images, in the plurality of images, whose vanishing points are determined not to satisfy the first condition, for example, determiner 26 determines that such determination target vanishing points do not satisfy the second subsequence condition.

More specifically, when the second subsequence condition is a condition of not being the two vanishing points relating to the two images subsequent to the image that is captured one image after the last captured image among the two subsequent images, in the plurality of images, whose vanishing points are determined not to satisfy the first condition, and when the first image, the second image captured one image after the first image, the third image captured one image after the second image, and the fourth image captured one image after the third image are present, for example, determiner 26 determines that the vanishing point relating to the third image and the vanishing point relating to the fourth image do not satisfy the second subsequence condition, when the vanishing point relating to the first image and the vanishing point relating to the second image are determined not to satisfy the first condition.

Also, the predetermined condition includes, for example, a speed condition, which is an example of the third condition. The speed condition is a condition that the amount of change in the speed of mobile object 1 falls within a predetermined range, where the amount of change is the amount of change that is observed during a predetermined period until the point in time at which an image, among the plurality of images, relating to a vanishing point to be subjected to a determination of whether the vanishing point satisfies the speed condition is captured.

When the amount of change in the speed of mobile object 1 during the predetermined period until the point in time at which the image, among the plurality of images, relating to the vanishing point to be subjected to a determination of whether the vanishing point satisfies the speed condition is captured falls within the predetermined range, determiner 26 determines that such vanishing point satisfies the speed condition. Meanwhile, when the amount of change in the speed of mobile object 1 during the predetermined period until the point in time at which the image, among the plurality of images, relating to the vanishing point to be subjected to a determination of whether the vanishing point satisfies the speed condition is captured does not fall within the predetermined range, determiner 26 determines that such vanishing point does not satisfy the speed condition.

More specifically, when the predetermined period is one second, for example, determiner 26 calculates the amount of change in the speed of mobile object 1 during one second until the point in time at which the image relating to the vanishing point to be subjected to a determination of whether the vanishing point satisfies the speed condition is captured, among the plurality of images, by subtracting the minimum speed from the maximum speed of mobile object 1 during one second until the point in time at which such image is captured. Also, when the predetermined period is one second, for example, determiner 26 obtains a first speed of mobile object 1, which is the speed at the point in time at which the image relating to the vanishing point to be subjected to a determination of whether the vanishing point satisfies the speed condition is captured among the plurality of images, and a second speed of mobile object 1, which is the speed at the point in time that is one second before the point in time at which such image is captured, and calculates the amount of change in the speed of mobile object 1 during one second until the point in time at which the foregoing image is captured, by subtracting the second speed from the first speed. Determiner 26 obtains the speed of mobile object 1 from, for example, a speed meter mounted on mobile object 1.

Note that when the amount of change in the speed of mobile object 1 during the predetermined period until the point in time at which the image, among the plurality of images, relating to the vanishing point to be subjected to a determination of whether the vanishing point satisfies the speed condition is captured does not fall within the predetermined range, for example, determiner 26 may determine that the vanishing point relating to the image captured during the predetermined period among the plurality of images does not satisfy the predetermined condition.

Estimator 28 estimates the attitude of mobile object 1, on the basis of one or more vanishing points, among the plurality of vanishing points, that are determined by determiner 26 to satisfy the predetermined condition. The plurality of vanishing points are, for example, a plurality of vanishing points that are calculated from when mobile object 1 starts operating up until the current time. Every time a vanishing point is calculated, for example, estimator 28 estimates the attitude of mobile object 1, on the basis of one or more vanishing points that are determined by determiner 26 to satisfy the predetermined condition among the plurality of vanishing points.

For example, estimator 28 calculates a first average value, which is the average value of the X-coordinate values of the foregoing one or more vanishing points and a second average value, which is the average value of Y-coordinate values of the foregoing one or more vanishing points, and calculates the average vanishing point, which is a point represented by the first average value and the second average value.

Every time imager 2 captures an image, for example, estimator 28 calculates the average vanishing point, calculates the distance between the center of such image and the average vanishing point, and calculates an attitude angle indicating the tilt of mobile object 1 from such distance and the focal distance of imager 2. As in the above manner, for example, estimator 28 estimates the attitude of mobile object 1 at the point in time at which each of the plurality of images is captured.

Also, for example, estimator 28 estimates the attitude of mobile object 1 on the basis of two or more vanishing points, among one or more vanishing points determined by determiner 26 to satisfy the predetermined condition, whose degree of variability falls within the predetermined range. The degree of variability of such two or more vanishing points is represented by, for example, the standard deviation of the positions of such two or more vanishing points. The degree of variability of such two or more vanishing points is also represented by, for example, the dispersion of the positions of such two or more vanishing points.

Stated differently, when a plurality of vanishing points are determined by determiner 26 to satisfy the predetermined condition, for example, estimator 28 extracts, from such plurality of vanishing points, two or more vanishing points whose degree of variability falls within the predetermined range, and estimates the attitude of mobile object 1 on the basis of such extracted two or more vanishing points.

More specifically, when determiner 26 determines that ten vanishing points satisfy the predetermined condition, for example, estimator 28 estimates the standard deviation of the positions of such ten vanishing points. When the standard deviation falls within the predetermined range, for example, estimator 28 calculates the average vanishing point of mobile object 1 on the basis of the foregoing ten vanishing points, and estimates the attitude of mobile object 1 on the basis of the average vanishing point. Meanwhile, when the standard deviation does not fall within the predetermined range, for example, estimator 28 calculates the standard deviation of nine vanishing points that remain after the vanishing point that is farthest from the average position is removed from the ten vanishing points, and determines whether the standard deviation falls within the predetermined range. As described above, when the standard deviation does not fall within the predetermined range, for example, estimator 28 decreases the number of vanishing points used to calculate the standard deviation and calculates the standard deviation again. Estimator 28 then determines whether the re-calculated standard deviation falls within the predetermined range. As described above, estimator 28 extracts, from one or more vanishing points determined by determiner 26 to satisfy the predetermined condition, two or more vanishing points whose degree of variability falls within the predetermined range, calculates the average vanishing point on the basis of such extracted two or more vanishing points, and estimates the attitude of mobile object 1 on the basis of such average vanishing point.

Overlay position determination device 14 determines the overlay position at which to overlay content to be displayed on a target object, on the basis of the attitude of mobile object 1 estimated by attitude estimation device 12. For example, overlay position determination device 14 obtains content-related data (head-up display (HUD) display data) from outside of display system 10, and selects, from such obtained data, content to be displayed in an overlaid manner.

When content is displayed in an overlaid manner on a target object, for example, overlay position determination device 14 determines the overlay position of such content, on the basis of the attitude angle of mobile object 1 at the point in time at which an image including such target object is captured. More specifically, in the case where the content is displayed in an overlaid manner on the target object and when mobile object 1 is tilted upward at the point in time at which the image including such target object is captured, for example, overlay position determination device 14 shifts the display position of the content more downward than the display position of the content for the case where mobile object 1 is not tilted. Also, in the case where the content is displayed in an overlaid manner on the target object and when mobile object 1 is tilted downward at the point in time at which the image including such target object is captured, overlay position determination device 14 shifts the display position of the content more upward than the display position of the content for the case where mobile object 1 is not tilted. As in the above manner, for example, overlay position determination device 14 determines the overlay position at which to overlay content to be displayed on a target object.

Display device 16 overlays the content at the overlay position determined by overlay position determination device 14 to display the content as a virtual image. For example, display device 16 projects light that forms the content toward the windshield of mobile object 1 to overlay the content at the overlay position determined by overlay position determination device 14 as a virtual image, thereby displaying the content overlaid on the target object.

The functional configuration of display system 10 is as described above.

Figure 2:
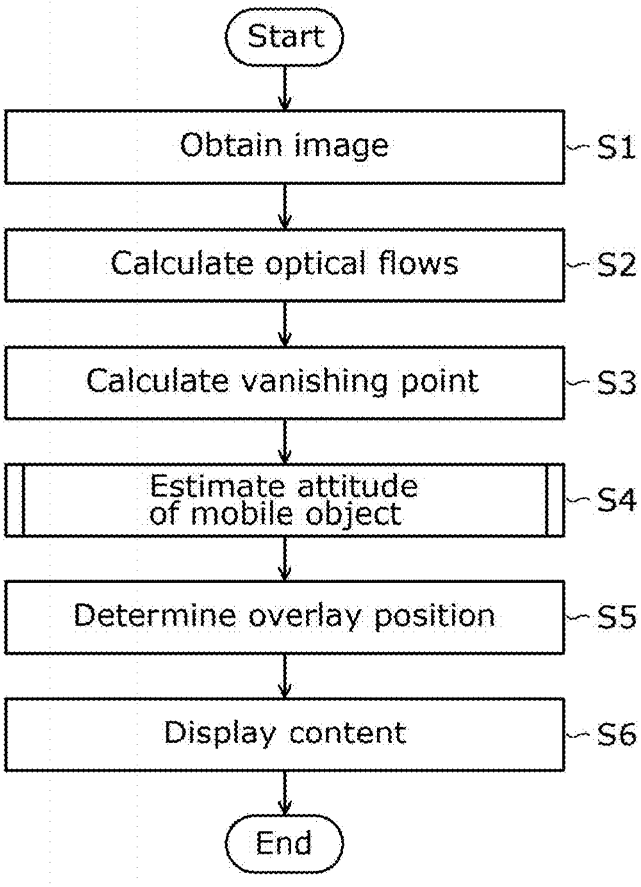
FIG. 2 is a flowchart showing an example of a display method performed by the display system shown in FIG. 1.
Figure 3:
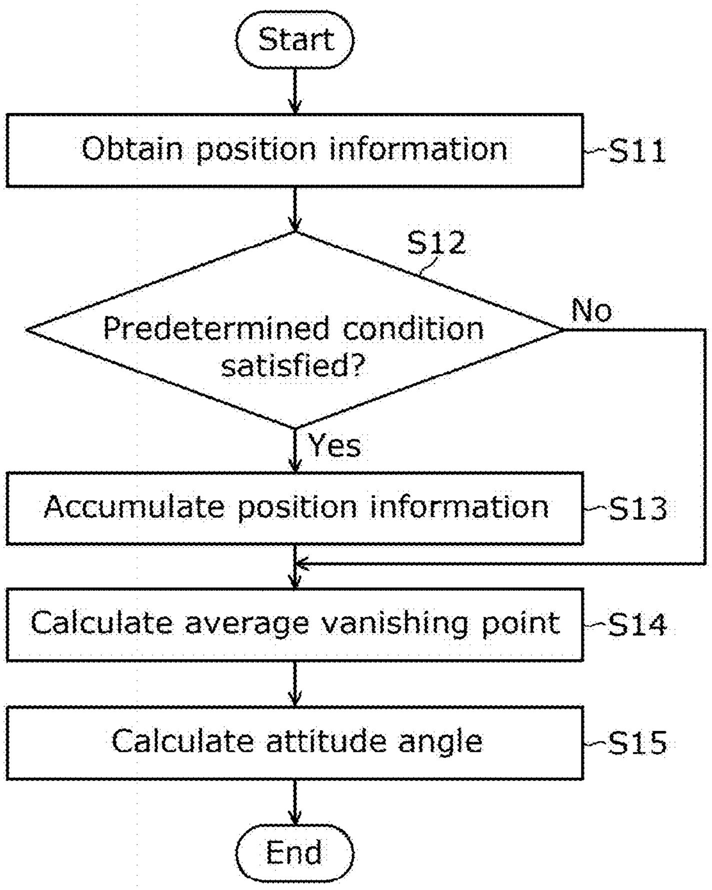
FIG. 3 is a flowchart showing an example of the operation included in step S4 shown in FIG. 2.

FIG. 2 is a flowchart showing an example of the display method performed by display system 10 shown in FIG. 1. FIG. 3 is a flowchart showing an example of the operation included in step S4 shown in FIG. 2. With reference to FIG. 2 and FIG. 3, the following describes an example of the display method.

First, as shown in FIG. 2, image obtainer 18 obtains an image captured by imager 2 (step S1). As described above, every time imager 2 captures an image, for example, image obtainer 18 obtains such image, thereby obtaining a plurality of images.

After image obtainer 18 obtains the image, optical flow calculator 20 calculates two or more optical flows relating to such image (step S2). For example, optical flow calculator 20 calculates two or more optical flows relating to the image in the manner described above.

Figure 4:
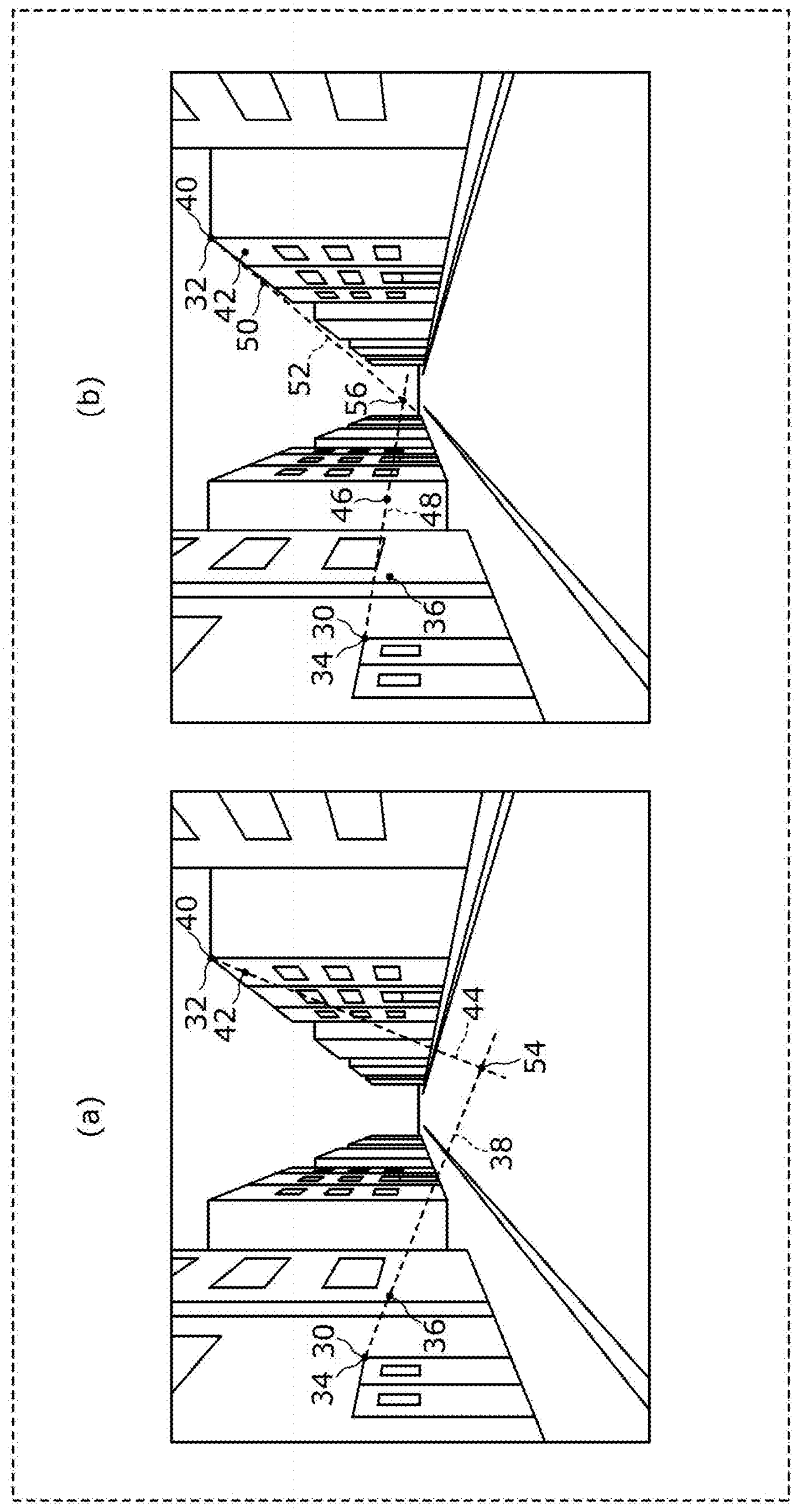
FIG. 4 is an explanation diagram for explaining optical flow calculation and vanishing point calculation performed by the display system shown in FIG. 1.

FIG. 4 is an explanation diagram for explaining optical flow calculation and vanishing point calculation performed by display system 10 shown in FIG. 1. (a) in FIG. 4 shows the case where optical flows and a vanishing point are calculated, using a calculation target image to be subjected to optical flow calculation and a previous image captured one image before such calculation target image. (b) in FIG. 4 shows the case where optical flows and a vanishing point are calculated, using the calculation target image to be subjected to optical flow calculation and a previous image captured two images before such calculation target image.

As shown in (a) in FIG. 4, for example, optical flow calculator 20 extracts door corner 30 and building corner 32 as two feature parts that appear in both the calculation target image and the previous image captured one image before such calculation target image. Upon extracting door corner 30, optical flow calculator 20 calculates line 38 that passes through first feature point 34, which is a point in the calculation target image and indicates the position of door corner 30 in the calculation target image, and second feature point 36, which is a point in the calculation target image and indicates the position of door corner 30 in the previous image. Also, upon extracting building corner 32, optical flow calculator 20 calculates line 44 that passes through first feature point 40, which is a point in the calculation target image and indicates the position of building corner 32 in the calculation target image, and second feature point 42, which is a point in the calculation target image and indicates the position of building corner 32 in the previous image. Optical flow calculator 20 determines line 38 and line 44 as two optical flows relating to the calculation target image.

Note that, when the calculation target image and the previous image captured one image before such calculation target image are used, and when the distance between first feature point 34 and second feature point 36 is not greater than or equal to a predetermined distance and the distance between first feature point 40 and second feature point 42 is not greater than or equal to the predetermined distance, for example, optical flow calculator 20 may use the calculation target image and the previous image captured two images before such calculation target image.

As shown in (b) in FIG. 4, for example, optical flow calculator 20 extracts door corner 30 and building corner 32 as two feature parts that appear in both the calculation target image and the previous image captured two images before such calculation target image. Upon extracting door corner 30, optical flow calculator 20 calculates line 48 that passes through first feature point 34, which is a point in the calculation target image and indicates the position of door corner 30 in the calculation target image, and second feature point 46, which is a point in the calculation target image and indicates the position of door corner 30 in the previous image. Also, upon extracting building corner 32, optical flow calculator 20 calculates line 52 that passes through first feature point 40, which is a point in the calculation target image and indicates the position of building corner 32 in the calculation target image, and second feature point 50, which is a point in the calculation target image and indicates the position of building corner 32 in the previous image. Optical flow calculator 20 takes line 48 and line 52 as two optical flows relating to the calculation target image.

With reference to FIG. 2 again, after optical flow calculator 20 calculates the two or more optical flows, vanishing point calculator 22 calculates a vanishing point on the basis of such two or more optical flows (step S3). For example, vanishing point calculator 22 calculates the vanishing point on the basis of the two or more optical flows as in the manner described above.

As shown in (a) in FIG. 4, when line 38 and line 44 are calculated as the two optical flows, for example, vanishing point calculator 22 calculates intersection 54 of line 38 and line 44 as the vanishing point.

Also, as shown in (b) in FIG. 4, when line 48 and line 52 are calculated as the two optical flows, for example, vanishing point calculator 22 calculates intersection 56 of line 48 and line 52 as the vanishing point.

With reference to FIG. 2 again, after vanishing point calculator 22 calculates the vanishing point, attitude estimation device 12 estimates the attitude of mobile object 1 (estimating of the attitude) (step S4).

First, as shown in FIG. 3, position information obtainer 24 obtains position information indicating the position of the vanishing point (step S11). Every time vanishing point calculator 22 calculates a vanishing position, for example, position information obtainer 24 obtains position information relating to such vanishing point, thereby obtaining items of position information indicating the positions of the vanishing points calculated on the basis of the two or more optical flows relating to the plurality of images captured by imager 2 (obtaining of position information).

After position information obtainer 24 obtains the position information, determiner 26 determines whether the vanishing point relating to such position information satisfies the predetermined condition, on the basis of the obtained position information (step S12). Every time position information obtainer 24 obtains position information, for example, determiner 26 determines whether the vanishing point satisfies the predetermined condition on the basis of such position information, thereby determining whether each of the plurality of vanishing points satisfies the predetermined condition, on the basis of each of the items of position information obtained in the obtaining of the position information (determining). For example, determiner 26 determines whether each vanishing point satisfies the predetermined condition as in the manner described above.

Figure 5:
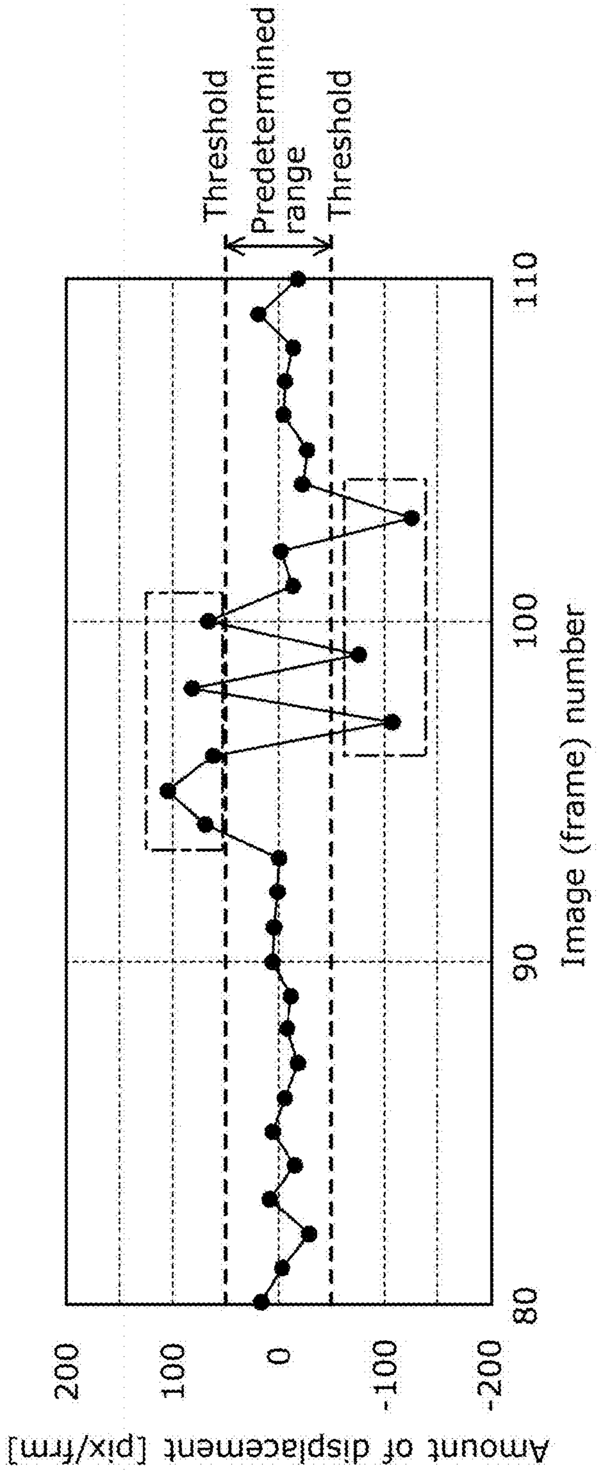
FIG. 5 is a first graph showing an example of the amounts of displacement relating to a plurality of images.

FIG. 5 is a first graph showing an example of the amounts of displacement relating to a plurality of images (frames).

As shown in FIG. 5, determiner 26 calculates the amount of displacement of the determination target vanishing point from the comparison vanishing point for each of the plurality of images, and determines whether each of the amounts of displacement falls within a predetermine range. Here, the predetermined range is between −50 [pix/frm] and 50 [pix/frm], inclusive.

Determiner 26 determines that the vanishing point relating to an image (frame) whose amount of displacement falls within the predetermined range, among the amounts of displacement, satisfies the predetermined condition (displacement amount condition). Meanwhile, determiner 26 determines that the vanishing point relating to an image whose amount of displacement does not fall within the predetermined range (see the squares represented by the dash-dot lines in FIG. 5), among the amounts of displacement, does not satisfy the predetermined condition.

Figure 6:
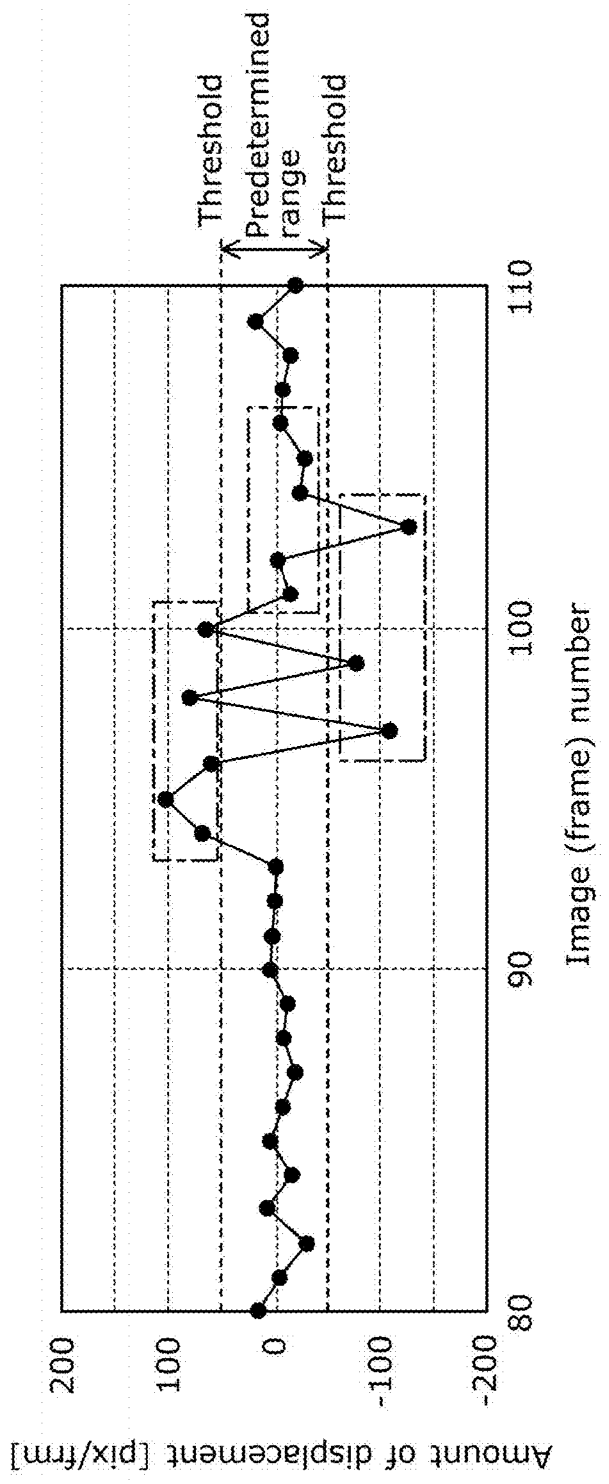
FIG. 6 is a second graph showing an example of the amounts of displacement relating to the plurality of images.

FIG. 6 is a second graph showing an example of the amounts of displacement relating to the plurality of images.

As shown in FIG. 6, for example, determiner 26 may not only determine that the vanishing point relating to an image whose amount of displacement does not fall within the predetermined range, among the amounts of displacement, does not satisfy the predetermined condition, but also determine that the vanishing points relating to images whose amounts of displacement relating to three images subsequent to the image captured one image after the foregoing image (see the squares represented by the dash-dot-dot lines in FIG. 6) do not satisfy the predetermined condition.

Figure 7:
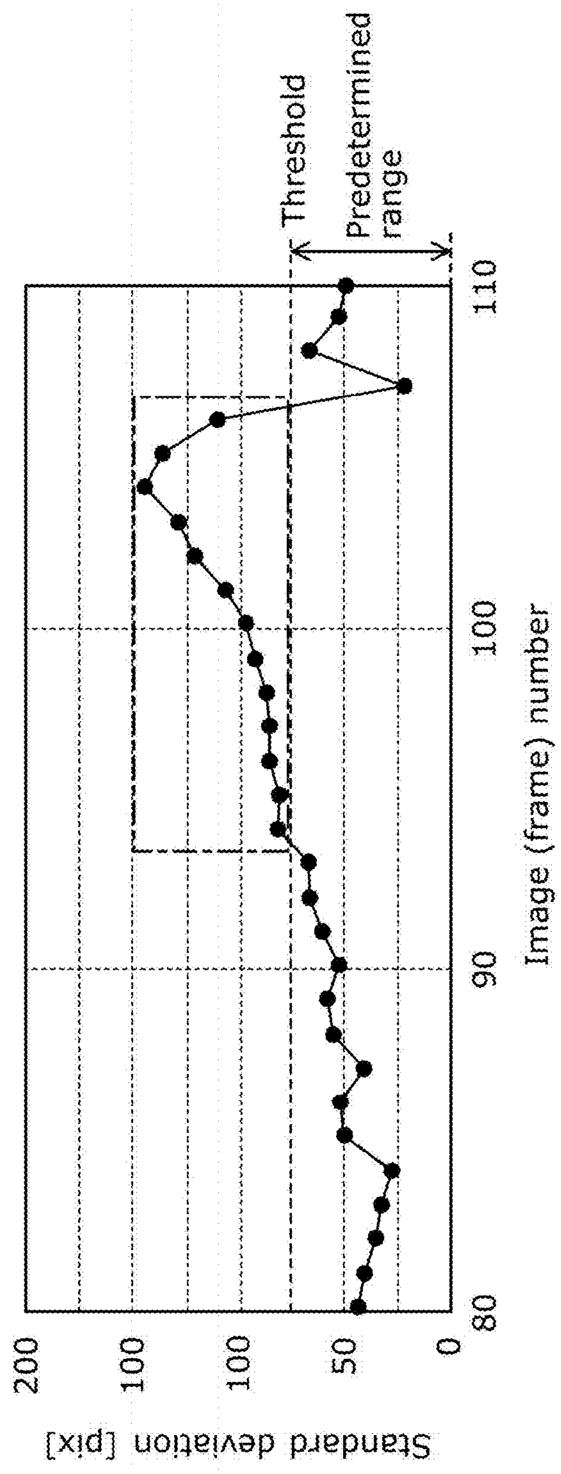
FIG. 7 is a graph showing an example of a plurality of standard deviations relating to the plurality of images.
Figure 8:
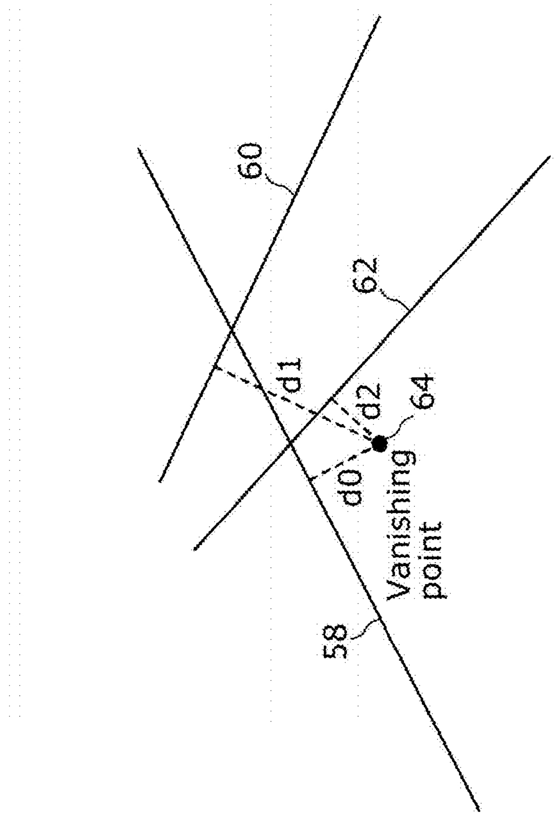
FIG. 8 is a schematic diagram showing an example of the distances between a vanishing point and two or more optical flows.

FIG. 7 is a graph showing an example of a plurality of standard deviations relating to the plurality of images. Each of the standard deviations is the standard deviation of two or more distances between a vanishing point and two or more optical flows. FIG. 8 is a schematic diagram showing an example of the distances between a vanishing point and two or more optical flows.

As shown in FIG. 7, determiner 26 calculates the standard deviation of the distances between a vanishing point and two or more optical flows for each of the plurality of images, and determines whether each of the standard deviations falls within a predetermined range. Here, the predetermined range is between 0 [pix] and 75 [pix], inclusive.

As shown in FIG. 8, when three optical flows 58, 60, and 62 have been calculated for a target image, for example, three distances d0, d1, and d2 between vanishing point 64 and three optical flows 58, 60, and 62 relating to such frame are calculated, and the standard deviations of three distances d0, d1, and d2 between vanishing point 64 and three optical flows 58, 60, and 62 are calculated, using three distances d0, d1, and d2.

With reference to FIG. 7 again, determiner 26 determines that the vanishing point in an image relating to a standard deviation that falls within the predetermined range, among the polarity of standard deviations, satisfies the predetermined condition (variability condition). Meanwhile, determiner 26 determines that the vanishing point in an image relating to a standard deviation that does not fall within the predetermined range (see the square represented by the dash-dot line in FIG. 7), among the plurality of standard deviations, does not satisfy the predetermined condition.

Figure 9:
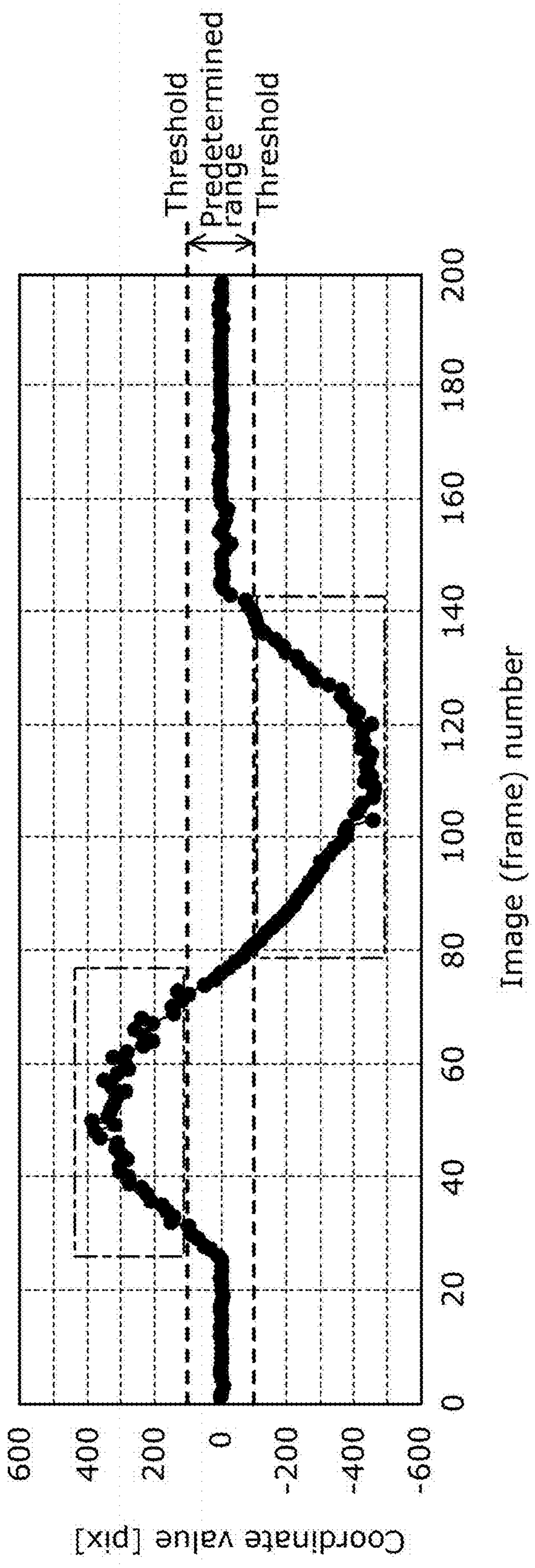
FIG. 9 is a graph showing an example of a plurality of coordinate values relating to the plurality of images.

FIG. 9 is a graph showing an example of a plurality of coordinate values relating to the plurality of images. Here, each of the coordinate values is the X-coordinate value of a vanishing point.

As shown in FIG. 9, determiner 26 determines whether each of the plurality of X-coordinate values relating to the plurality of images falls within a predetermined range. Here, the predetermined range is between −100 [pix/frame] and 100 [pix/frame], inclusive.

Note that determiner 26 also determines whether each of the Y-coordinate values of the plurality of vanishing points relating to the plurality of images falls within a predetermined range. The predetermined range is, for example, between −100 [pix/frm] and 100 [pix/frm], inclusive.

Determiner 26 determines that a vanishing point in an image, which relates to an X-coordinate value that falls within the predetermined range among the plurality of X-coordinate values and which relates to a Y-coordinate value that falls within the predetermined range among the plurality of Y-coordinate values, satisfies the predetermined condition (position information). Meanwhile, determiner 26 determines that a vanishing point in an image, which relates to an X-coordinate value that does not fall within the predetermined range (see the squares represented by the dash-dot lines in FIG. 9) among the plurality of X-coordinate values, does not satisfy the predetermined condition.

With reference to FIG. 3 again, when determiner 26 determines that the vanishing point satisfies the predetermined condition (Yes in step S12), attitude estimation device 12 accumulates the position information relating to such vanishing point (step S13). Every time determiner 26 determines that a vanishing point satisfies the predetermined condition, for example, attitude estimation device 12 accumulates the position information relating to such vanishing point, thereby accumulating one or more items of position information relating to one or more vanishing points that satisfy the predetermined condition among the plurality of vanishing points.

When determiner 26 determines that the vanishing point does not satisfy the predetermined condition (No in step S12), attitude estimation device 12 does not accumulate the position information relating to such vanishing point.

Estimator 28 calculates the average vanishing point that is located in the average position of the positions of one or more vanishing points, on the basis of the accumulated one or more items of position information (step S14). For example, estimator 28 calculates the average vanishing point in the manner described above.

After calculating the average vanishing point, estimator 28 calculates the attitude angle of mobile object 1, using the average vanishing point (step S15). For example, estimator 28 calculates the attitude angle of mobile object 1, using the average vanishing point in the manner described above.

As described above, estimator 28 estimates the attitude of mobile object 1 on the basis of one or more vanishing points determined in the determining to satisfy the predetermined condition among the plurality of vanishing points (estimating of the attitude).

With reference to FIG. 2 again, overlay position determination device 14 determines the overlay position at which to overlay content to be displayed on a target object, on the basis of the attitude of mobile object 1 estimated in the estimating of the attitude (determining of overlay position) (step S5). For example, overlay position determination device 14 determines the overlay position at which to overlay the content to be displayed on the target object in the manner described above.

Display device 16 overlays the content at the overlay position determined in the determining of overlay position to display the content as a virtual image (displaying) (step S6). For example, display device 16 overlays the content at the overlay position determined in the determining of the overlay position to display the content as a virtual image in the manner described above.

An example of the display method is as described above.

When a dynamic change occurs in the attitude of mobile object 1, for example, display system 10 and so forth are capable of estimating the attitude of mobile object 1 without using the vanishing point relating to the image captured at the point in time at which such change occurs. With this, it is possible to more accurately calculate a static attitude of mobile object 1 and more appropriately display the content.

Display system 10 and so forth are as described above.

Display system 10 according to the present embodiment includes: attitude estimation device 12 that includes position information obtainer 24 that obtains position information indicating a position of a vanishing point that is calculated based on two or more optical flows relating to each of a plurality of images captured by imager 2 that is mounted on mobile object 1 and repeatedly performs image capturing, determiner 26 that determines whether each of a plurality of vanishing points satisfies a predetermined condition, based on a corresponding one of items of position information obtained by position information obtainer 24, the plurality of vanishing points each being the vanishing point, the items of position information each being the position information, and estimator 28 that estimates an attitude of mobile object 1, based on one or more vanishing points, among the plurality of vanishing points, that are determined by determiner 26 to satisfy the predetermined condition; overlay position determination device 14 that determines an overlay position at which to overlay content to be displayed on a target object, based on the attitude of mobile object 1 estimated by attitude estimation device 12; and display device 16 that displays the content as a virtual image overlaid at the overlay position determined by overlay position determination device 14.

With this, it is possible to estimate the attitude of mobile object 1 on the basis of one or more vanishing points determined to satisfy the predetermined condition, thus preventing the use of a vanishing point with poor calculation accuracy in estimating the attitude of mobile object 1. It is thus possible to more accurately estimate the attitude of mobile object 1. Also, since the attitude of mobile object 1 is estimated more accurately, it is possible to display content more appropriately.

Also, the predetermined condition includes a first condition (displacement amount condition), and when a vanishing point, among the plurality of vanishing points, to be subjected to a determination of whether the vanishing point satisfies the first condition (displacement amount condition) is taken as a determination target vanishing point, and a vanishing point, among the plurality of vanishing points, relating to an image captured one image before an image relating to the determination target vanishing point among the plurality of images is taken as a comparison vanishing point, the first condition (displacement amount condition) is a condition that an amount of displacement of the determination target vanishing point from the comparison vanishing point falls within a predetermined range.

With this, it is possible to prevent the use of the determination target vanishing point in estimating the attitude of mobile object 1, when the amount of displacement of such determination target vanishing point from the comparison vanishing point does not fall within the predetermined range. It is thus possible to more accurately estimate the attitude of mobile object 1 and more appropriately display the content.

Also, the predetermined condition includes a first condition (variability condition), and when a vanishing point, among the plurality of vanishing points, to be subjected to a determination of whether the vanishing point satisfies the first condition (variability condition) is taken as a determination target vanishing point, and an image, among the plurality of images, relating to the determination target vanishing point is taken as a determination target image, the first condition (variability condition) is a condition that a degree of variability falls within a predetermined range, the degree of variability being a degree at which the two or more optical flows relating to the determination target image vary with respect to the determination target vanishing point.

With this, it is possible to prevent the use of the determination target vanishing point in estimating the attitude of mobile object 1, when the degree of variability of the two or more optical flows relating to the determination target image with respect to such determination target vanishing point does not fall within the predetermined range. It is thus possible to more accurately estimate the attitude of mobile object 1 and more appropriately display the content.

Also, the predetermined condition includes a first condition (position information), and when a vanishing point, among the plurality of vanishing points, to be subjected to a determination of whether the vanishing point satisfies the first condition (position information) is taken as a determination target vanishing point, the first condition (position information) is a condition that the determination target vanishing point is located within a predetermined range.

With this, it is possible to prevent the use of the determination target vanishing point in estimating the attitude of mobile object 1, when such determination target vanishing point does not fall within the predetermined range. It is thus possible to more accurately estimate the attitude of mobile object 1 and more appropriately display the content.

Also, the predetermined condition includes a second condition of not being a vanishing point, among the plurality of vanishing points, relating to an image captured one image after an image, among the plurality of images, relating to a vanishing point that is determined not to satisfy the first condition (displacement amount condition, variability condition, and position information), or not being two or more vanishing points, among the plurality of vanishing points, relating to two or more images subsequent to the image captured one image after the image, among the plurality of images, relating to the vanishing point determined not to satisfy the first condition.

With this, it is possible to prevent the use of the vanishing point, in estimating the attitude of mobile object 1, which is a vanishing point relating to the image captured at the timing that is close to the timing at which the image relating to the vanishing point determined not to satisfy the first condition is captured. It is thus possible to more accurately estimate the attitude of mobile object 1 and more appropriately display the content.

Also, the predetermined condition includes a second condition of not being a vanishing point, among the plurality of vanishing points, relating to an image captured one image after a last captured image in two or more subsequent images, among the plurality of images, whose vanishing points are determined not to satisfy the first condition or not being two or more vanishing points, among the plurality of vanishing points, relating to two or more images subsequent to the image captured one image after the last captured image in the two or more subsequent images, among the plurality of images, whose vanishing points are determined not to satisfy the first condition.

With this, it is possible to prevent the use of the vanishing points, in estimating the attitude of mobile object 1, which are vanishing points relating to the images captured at the timing that is close to the timing at which the two or more subsequent images relating to the vanishing points determined not to satisfy the first condition are captured. It is thus possible to more accurately estimate the attitude of mobile object 1 and more appropriately display the content.

Also, the predetermined condition includes a third condition (speed condition), and the third condition (speed condition) is a condition that an amount of change in a speed of mobile object 1 during a predetermined period falls within a predetermined range, the predetermined period being a period until a point in time at which an image among the plurality of images is captured, the image relating to a vanishing point, among the plurality of vanishing points, to be subjected to a determination of whether the vanishing point satisfies the third condition (speed condition).

With this, it is possible to prevent the use of the vanishing point, in estimating the attitude of mobile object 1, which is a vanishing point relating to the image captured when the amount of change in the speed of mobile object 1 does not fall within the predetermined range. It is thus possible to more accurately estimate the attitude of mobile object 1 and more appropriately display the content.

Also, estimator 28 estimates the attitude of mobile object 1, based on two or more vanishing points among the one or more vanishing points determined by determiner 26 to satisfy the predetermined condition, the two or more vanishing points being vanishing points whose degree of variability falls within a predetermined range.

With this, it is possible to estimate the attitude of mobile object 1 on the basis of the two or more vanishing points whose degree of variability is within the predetermined range. It is thus possible to more accurately estimate the attitude of mobile object 1 and more appropriately display the content.

Also, display system 10 according to the present embodiment further includes: image obtainer 18 that obtains the plurality of images; optical flow calculator 20 that calculates the two or more optical flows relating to each of the plurality of images; and vanishing point calculator 22 that calculates the vanishing point relating to each of the plurality of images, based on the two or more optical flows relating to each of the plurality of images.

With this, it is possible, in display system 10, to calculate two or more optical flows relating to each of the plurality of images and calculate a vanishing point relating to each of the plurality of images.

Also, when an image, among the plurality of images, to be subjected to a calculation of the two or more optical flows is taken as a calculation target image, and an image, among the plurality of images, captured before the calculation target image is taken as a previous image, optical flow calculator 20: determines the previous image for each of the two or more optical flows relating to the calculation target image; extracts a feature part that appears in both the calculation target image and the previous image determined; calculates a line that passes through a first feature point and a second feature point, the first feature point being a point in the calculation target image and indicating a position of the feature part in the calculation target image, the second feature point being a point in the calculation target image and indicating a position of the feature part in the previous image determined; and takes the line calculated as the optical flow.

With this, it is possible to easily calculate each of the two or more optical flows relating to the calculation target image.

Also, optical flow calculator 20 determines, as the previous image, an image captured two or more images before the calculation target image for at least one of the two or more optical flows relating to the calculation target image.

With this, it is possible to more accurately calculate at least one of the two or more optical flows relating to the calculation target image, using an increased distance between the first feature point and the second feature point. It is thus possible to more accurately calculate the vanishing point relating to the calculation target image, more accurately estimate the attitude of mobile object 1, and more appropriately display the content.

Also, optical flow calculator 20 determines, as the previous image, the image captured two or more images before the calculation target image for each of 50% or more optical flows among the two or more optical flows relating to the calculation target image.

With this, it is possible to more accurately calculate the number of optical flows that is greater than or equal to 50% of the two or more optical flows relating to the calculation target image. It is thus possible to more accurately calculate the vanishing point relating to the calculation target image, more accurately estimate the attitude of mobile object 1, and more appropriately display the content.

Also, when a distance between the first feature point and the second feature point is taken as a feature point distance, optical flow calculator 20 determines the previous image with which the feature point distance is greater than or equal to a predetermined distance for at least one of the two or more optical flows relating to the calculation target image.

With this, it is possible to more accurately calculate at least one of the two or more optical flows relating to the calculation target image, using the distance between the first feature point and the second feature point that is greater than or equal to the predetermined distance. It is thus possible to more accurately calculate the vanishing point relating to the calculation target image, more accurately estimate the attitude of mobile object 1, and more appropriately display the content.

Also, the attitude estimation method according to an aspect of the present disclosure includes: obtaining position information indicating a position of a vanishing point that is calculated based on two or more optical flows relating to each of a plurality of images captured by imager 2 that is mounted on mobile object 1 and repeatedly performs image capturing; determining whether each of a plurality of vanishing points satisfies a predetermined condition, based on a corresponding one of items of position information obtained in the obtaining, the plurality of vanishing points each being the vanishing point, the items of position information each being the position information; estimating an attitude of mobile object 1, based on one or more vanishing points, among the plurality of vanishing points, determined in the determining to satisfy the predetermined condition (step S4); determining an overlay position at which to overlay content to be displayed on a target object, based on the attitude of the mobile object estimated in the estimating (step S5); and displaying the content as a virtual image overlaid at the overlay position determined in the determining of the overlay position (step S6).

With this, it is possible to achieve the same working effects as those achieved by display system 10 described above.

Other Embodiments, Etc.

The display system and so forth according to one or more aspects have been described above on the basis of the embodiment, but the present disclosure is not limited to such embodiment. The scope of the present disclosure may also include an embodiment achieved by making various modifications to the embodiment that can be conceived by those skilled in the art without departing from the essence of the present disclosure.

Each of the elements in the foregoing embodiment may be configured in the form of an exclusive hardware product, or may be realized by executing a software program suitable for the element. Each of the elements may be realized by means of a program executing unit, such as a central processing unit (CPU) and a processor, reading and executing the software program recorded on a recording medium such as a hard disk or a semiconductor memory. Here, the software program that realizes the devices and so forth in the foregoing embodiment is a program for causing a computer to execute the steps included in the flowcharts shown in FIG. 2 and FIG. 3.

Note that the present disclosure also includes the cases described below.

(1) At least one of the foregoing devices is, more specifically, a computer system that includes a microprocessor, a ROM, a RAM, a hard disk unit, a display unit, a keyboard, a mouse, etc. The RAM or the hard disk unit stores the computer program. The microprocessor's operating in accordance with the computer program enables at least one of the foregoing devices to achieve its function. Here, the computer program is configured, using a combination of a plurality of command codes representing instructions given to the computer to achieve a predetermined function.

(2) One or more, or all of the elements included in at least one of the foregoing devices may be configured in the form of a single system large scale integration (LSI). The system LSI is a super-multifunctional LSI that is manufactured by integrating a plurality of elements onto a single chip. The system LSI is, more specifically, a computer system that includes a microprocessor, a ROM, a RAM, and so forth. The RAM stores the computer program. The microprocessor's operating in accordance with the computer program enables the system LSI to achieve its function.

(3) One or more, or all of the elements included in at least one of the foregoing devices may be implemented in the form of an integrated circuit (IC) card removable from the device or a single module. The IC card or the module is a computer system that includes a microprocessor, a ROM, a RAM, and so forth. The IC card or the module may include the foregoing super-multifunctional LSI. The microprocessor's operating in accordance with the computer program enables the IC card or the module to achieve its function. Such IC card or the module may be tamper resistant.

(4) The present disclosure may be the method described above. The present disclosure may also be a computer program that enables such method to be implemented by means of a computer, or digital signals that form a computer program.

The present disclosure may be configured by means of recording a computer program or digital signals on a computer-readable recording medium such as a flexible disk, a hard disk, a compact (CD)-ROM, a DVD, a DVD-ROM, a DVD-RAM, a Blu-ray (Registered Trademark) disc (BD), and a semiconductor memory. The present disclosure may also be digital signals recorded in such recording medium.

The present disclosure may be configured by means of transmitting the computer program or the digital signals via, for example, a telecommunication line, a wireless or wired communication line, a network represented by the Internet, and data broadcasting.

The present disclosure may be implemented by means of transmitting the program or the digital signals recorded on a recording medium or transmitting the program or the digital signals via, for example, a network, thereby enabling another independent computer system to carry out the present disclosure.

APPENDIX

The foregoing description of the embodiment and so forth discloses the technologies described below.

Technology 1

A display system including:

an attitude estimation device that includes a position information obtainer that obtains position information indicating a position of a vanishing point that is calculated based on two or more optical flows relating to each of a plurality of images captured by an imager that is mounted on a mobile object and repeatedly performs image capturing, a determiner that determines whether each of a plurality of vanishing points satisfies a predetermined condition, based on a corresponding one of items of position information obtained by the position information obtainer, the plurality of vanishing points each being the vanishing point, the items of position information each being the position information, and an estimator that estimates an attitude of the mobile object, based on one or more vanishing points, among the plurality of vanishing points, that are determined by the determiner to satisfy the predetermined condition;

an overlay position determination device that determines an overlay position at which to overlay content to be displayed on a target object, based on the attitude of the mobile object estimated by the attitude estimation device; and a display device that displays the content as a virtual image overlaid at the overlay position determined by the overlay position determination device.

Technology 2

The display system according to technology 1, wherein the predetermined condition includes a first condition, and when a vanishing point, among the plurality of vanishing points, to be subjected to a determination of whether the vanishing point satisfies the first condition is taken as a determination target vanishing point, and a vanishing point, among the plurality of vanishing points, relating to an image captured one image before an image relating to the determination target vanishing point among the plurality of images is taken as a comparison vanishing point, the first condition is a condition that an amount of displacement of the determination target vanishing point from the comparison vanishing point falls within a predetermined range.

Technology 3

The display system according to technology 1, wherein the predetermined condition includes a first condition, and when a vanishing point, among the plurality of vanishing points, to be subjected to a determination of whether the vanishing point satisfies the first condition is taken as a determination target vanishing point, and an image, among the plurality of images, relating to the determination target vanishing point is taken as a determination target image, the first condition is a condition that a degree of variability falls within a predetermined range, the degree of variability being a degree at which the two or more optical flows relating to the determination target image vary with respect to the determination target vanishing point.

Technology 4

The display system according to technology 1, wherein the predetermined condition includes a first condition, and when a vanishing point, among the plurality of vanishing points, to be subjected to a determination of whether the vanishing point satisfies the first condition is taken as a determination target vanishing point, the first condition is a condition that the determination target vanishing point is located within a predetermined range.

Technology 5

The display system according to any one of technologies from 2 to 4, wherein the predetermined condition includes a second condition of not being a vanishing point, among the plurality of vanishing points, relating to an image captured one image after an image, among the plurality of images, relating to a vanishing point that is determined not to satisfy the first condition, or not being two or more vanishing points, among the plurality of vanishing points, relating to two or more images subsequent to the image captured one image after the image, among the plurality of images, relating to the vanishing point determined not to satisfy the first condition.

Technology 6

The display system according to any one of technologies from 2 to 4, wherein the predetermined condition includes a second condition of not being a vanishing point, among the plurality of vanishing points, relating to an image captured one image after a last captured image in two or more subsequent images, among the plurality of images, whose vanishing points are determined not to satisfy the first condition or not being two or more vanishing points, among the plurality of vanishing points, relating to two or more images subsequent to the image captured one image after the last captured image in the two or more subsequent images, among the plurality of images, whose vanishing points are determined not to satisfy the first condition.

Technology 7

The display system according to any one of technologies from 1 to 6, wherein the predetermined condition includes a third condition that an amount of change in a speed of the mobile object during a predetermined period falls within a predetermined range, the predetermined period being a period until a point in time at which an image among the plurality of images is captured, the image relating to a vanishing point, among the plurality of vanishing points, to be subjected to a determination of whether the vanishing point satisfies the third condition.

Technology 8

The display system according to any one of technologies from 1 to 7, wherein the estimator estimates the attitude of the mobile object, based on two or more vanishing points among the one or more vanishing points determined by the determiner to satisfy the predetermined condition, the two or more vanishing points being vanishing points whose degree of variability falls within a predetermined range.

Technology 9

The display system according to any one of technologies from 1 to 8, further including:

an image obtainer that obtains the plurality of images;

an optical flow calculator that calculates the two or more optical flows relating to each of the plurality of images; and a vanishing point calculator that calculates the vanishing point relating to each of the plurality of images, based on the two or more optical flows relating to each of the plurality of images.

Technology 10

The display system according to technology 9, wherein when an image, among the plurality of images, to be subjected to a calculation of the two or more optical flows is taken as a calculation target image, and an image, among the plurality of images, captured before the calculation target image is taken as a previous image, the optical flow calculator:

determines the previous image for each of the two or more optical flows relating to the calculation target image;

extracts a feature part that appears in both the calculation target image and the previous image determined;

calculates a line that passes through a first feature point and a second feature point, the first feature point being a point in the calculation target image and indicating a position of the feature part in the calculation target image, the second feature point being a point in the calculation target image and indicating a position of the feature part in the previous image determined; and takes the line calculated as the optical flow.

Technology 11

The display system according to technology 10, wherein the optical flow calculator determines, as the previous image, an image captured two or more images before the calculation target image for at least one of the two or more optical flows relating to the calculation target image.

Technology 12

The display system according to technology 11, wherein the optical flow calculator determines, as the previous image, the image captured two or more images before the calculation target image for each of 50% or more optical flows among the two or more optical flows relating to the calculation target image.

Technology 13

The display system according to any one of technologies from 10 to 12, wherein when a distance between the first feature point and the second feature point is taken as a feature point distance, the optical flow calculator determines the previous image with which the feature point distance is greater than or equal to a predetermined distance for at least one of the two or more optical flows relating to the calculation target image.

Note that each of the units included in the foregoing display system as elements may be configured in the form of a circuit, or a plurality of units included in the display system may be configured in the form of a single circuit.

Technology 14

A display method performed by a display system that includes an attitude estimation device, an overlay position determination device, and a display device, the display method including:

obtaining position information indicating a position of a vanishing point that is calculated based on two or more optical flows relating to each of a plurality of images captured by an imager that is mounted on a mobile object and repeatedly performs image capturing;

determining whether each of a plurality of vanishing points satisfies a predetermined condition, based on a corresponding one of items of position information obtained in the obtaining, the plurality of vanishing points each being the vanishing point, the items of position information each being the position information;

estimating an attitude of the mobile object, based on one or more vanishing points, among the plurality of vanishing points, determined in the determining to satisfy the predetermined condition;

determining an overlay position at which to overlay content to be displayed on a target object, based on the attitude of the mobile object estimated in the estimating; and displaying the content as a virtual image overlaid at the overlay position determined in the determining of the overlay position.

While an embodiment has been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2022-054888 filed on Mar. 30, 2022, and PCT International Application No. PCT/JP2023/003281 filed on Feb. 1, 2023.

INDUSTRIAL APPLICABILITY

The present disclosure is applicable for use as, for example, a display system that estimates the attitude of a mobile object and displays content on the basis of the attitude of the mobile object.

The invention claimed is:

1. A display system comprising:

an attitude estimation device that includes a first circuit that obtains position information indicating a position of a vanishing point that is calculated based on two or more optical flows relating to each of a plurality of images captured by a camera that is mounted on a mobile object and repeatedly performs image capturing, a second circuit that determines whether each of a plurality of vanishing points, obtained by the first circuit, satisfies a predetermined condition, based on a corresponding one of items of position information obtained by the first circuit, and a third circuit that estimates an attitude of the mobile object, based on one or more vanishing points, among the plurality of vanishing points, that are determined by the second circuit to satisfy the predetermined condition;

an overlay position determination device that determines an overlay position at which to overlay content to be displayed on a target object, based on the attitude of the mobile object estimated by the attitude estimation device; and a display device that displays the content as a virtual image overlaid at the overlay position determined by the overlay position determination device, wherein the predetermined condition includes a first condition, and when a determination target vanishing point, among the plurality of vanishing points, to be subjected to a determination of whether the vanishing point satisfies the first condition is taken as the determination target vanishing point, and a determination target image, among the plurality of images, relating to the determination target vanishing point is taken as the determination target image, the first condition includes a degree of variability being within a predetermined range, the degree of variability being a degree at which each of the two or more optical flows relating to the determination target image varies in distance with respect to the determination target vanishing point.

2. The display system according to claim 1, when a vanishing point, among the plurality of vanishing points, to be subjected to the determination of whether the vanishing point satisfies the first condition is taken as the determination target vanishing point, and the vanishing point, among the plurality of vanishing points, relating to an image captured one image before an image relating to the determination target vanishing point among the plurality of images is taken as a comparison vanishing point, the first condition includes an amount of displacement of the determination target vanishing point from the comparison vanishing point being within a second predetermined range.

3. The display system according to claim 1, when a vanishing point, among the plurality of vanishing points, to be subjected to the determination of whether the vanishing point satisfies the first condition is taken as the determination target vanishing point, the first condition includes the determination target vanishing point being located within a second predetermined range.

4. The display system according to claim 1, wherein the predetermined condition includes a third condition that an amount of change in a speed of the mobile object during a predetermined period falls within a second predetermined range, the predetermined period being until a point in time at which an image among the plurality of images is captured, the image relating to a vanishing point, among the plurality of vanishing points, to be subjected to a second determination of whether the vanishing point satisfies the third condition.

5. The display system according to claim 1, wherein the third circuit estimates the attitude of the mobile object, based on two or more vanishing points among the one or more vanishing points determined by the second circuit to satisfy the predetermined condition, the two or more vanishing points being vanishing points whose degree of variability falls within the predetermined range.

6. The display system according to claim 1, further comprising:

a fourth circuit that obtains the plurality of images;

a fifth circuit that calculates the two or more optical flows relating to each of the plurality of images; and a sixth circuit that calculates the vanishing point relating to each of the plurality of images, based on the two or more optical flows relating to each of the plurality of images.

7. The display system according to claim 6, wherein when an image, among the plurality of images, to be subjected to a calculation of the two or more optical flows is taken as a calculation target image, and an image, among the plurality of images, captured before the calculation target image is taken as a previous image, the fifth circuit:

determines the previous image for each of the two or more optical flows relating to the calculation target image;

extracts a feature part that appears in both the calculation target image and the previous image determined;

calculates a line that passes through a first feature point and a second feature point, the first feature point being a point in the calculation target image and indicating a position of the feature part in the calculation target image, the second feature point being a point in the calculation target image and indicating a position of the feature part in the previous image determined; and takes the line calculated as the optical flow.

8. The display system according to claim 7, wherein the fifth circuit determines, as the previous image, an image captured two or more images before the calculation target image for at least one of the two or more optical flows relating to the calculation target image.

9. The display system according to claim 8, wherein the fifth circuit determines, as the previous image, the image captured two or more images before the calculation target image for each of 50% or more optical flows among the two or more optical flows relating to the calculation target image.

10. The display system according to claim 7, wherein when a distance between the first feature point and the second feature point is taken as a feature point distance, the fifth circuit determines the previous image with which the feature point distance is greater than or equal to a predetermined distance for at least one of the two or more optical flows relating to the calculation target image.

11. A display method performed by a display system that includes an attitude estimation device, an overlay position determination device, and a display device, the display method comprising:

obtaining position information indicating a position of a vanishing point that is calculated based on two or more optical flows relating to each of a plurality of images captured by a camera that is mounted on a mobile object and repeatedly performs image capturing;

determining whether each of a plurality of vanishing points, obtained by the first circuit, satisfies a predetermined condition, based on a corresponding one of items of position information obtained in the obtaining;

estimating an attitude of the mobile object, based on one or more vanishing points, among the plurality of vanishing points, determined in the determining to satisfy the predetermined condition;

determining an overlay position at which to overlay content to be displayed on a target object, based on the attitude of the mobile object estimated in the estimating; and displaying the content as a virtual image overlaid at the overlay position determined in the determining of the overlay position, wherein the predetermined condition includes a first condition, and when a determination target vanishing point, among the plurality of vanishing points, to be subjected to a determination of whether the vanishing point satisfies the first condition is taken as the determination target vanishing point, and a determination target image, among the plurality of images, relating to the determination target vanishing point is taken as the determination target image, the first condition includes a degree of variability being within a predetermined range, the degree of variability being a degree at which each of the two or more optical flows relating to the determination target image varies in distance with respect to the determination target vanishing point.

* * * * *